US012718739B2

(12) United States Patent
Lim

(10) Patent No.: US 12,718,739 B2
(45) Date of Patent: Aug. 25, 2026

(54) IMAGE DISPLAY APPARATUS

(71) Applicant: LG ELECTRONICS INC., Seoul (KR)

(72) Inventor: Kyoungryul Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 266 days.

(21) Appl. No.: 18/677,724

(22) Filed: May 29, 2024

(65) Prior Publication Data

US 2025/0182671 A1 Jun. 5, 2025

(30) Foreign Application Priority Data

Nov. 30, 2023 (KR) ........................ 10-2023-0170958

(51) Int. Cl.
*G09G 3/20* (2006.01)
*G09G 3/3233* (2016.01)
*H02M 3/335* (2006.01)
*H02M 7/06* (2006.01)

(52) U.S. Cl.
CPC ......... *G09G 3/2096* (2013.01); *G09G 3/3233* (2013.01); *G09G 2300/0842* (2013.01); *G09G 2330/021* (2013.01); *H02M 3/33569* (2013.01); *H02M 7/06* (2013.01)

(58) Field of Classification Search
CPC .......... G09G 3/2096; G09G 2330/021; H02M 3/33569
See application file for complete search history.

(56) References Cited

U.S. PATENT DOCUMENTS 10,802,331 B2 * 10/2020 Liu .................... G02F 1/133602
2017/0038823 A1 * 2/2017 Lee ........................ G06F 1/3265
2019/0214915 A1 7/2019 Jeong et al.
2022/0158548 A1 * 5/2022 Jang .................. H02M 3/33507
2022/0165204 A1 * 5/2022 Kim ..................... G09G 3/3696

FOREIGN PATENT DOCUMENTS

KR 1020090074367 7/2009
KR 1020190043371 4/2019

OTHER PUBLICATIONS

Korean Intellectual Property Office Application No. 10-2023-0170958, Office Action dated Aug. 11, 2025, 5 pages.

* cited by examiner

*Primary Examiner* — Gary A Nash
(74) *Attorney, Agent, or Firm* — LEE, HONG, DEGERMAN, KANG & WAIMEY

(57) ABSTRACT

An image display apparatus is disclosed. The image display apparatus according to an embodiment of the present disclosure includes: a display; a relay to switch an input AC voltage; a first converter connected to the relay, and to convert the input AC voltage into a DC voltage; a second converter spaced apart from the relay, and to convert the input AC voltage into a DC voltage; a first micom to operate based on the DC voltage from the second converter; a signal processing device including a second micom, and to output a video signal to the display; a first switch disposed between the second converter and the second micom; and a second switch disposed between the first converter and the signal processing device. Accordingly, it is possible to stably operate the signal processing device and the micom in the signal processing device during supply of the input AC voltage.

20 Claims, 26 Drawing Sheets

170
Demultiplexer
310
Audio processor
370
320
Image decoder
325
Scaler
335
Image quality processor
635
Processor
330
OSD processor
340
Mixer
345
Frame rate converter
350
Formatter
360

IMAGE DISPLAY APPARATUS

CROSS-REFERENCE TO RELATED APPLICATION(S)

Pursuant to 35 U.S.C. § 119, this application claims the benefit of earlier filing date and right of priority to Korean Application No(s). 10-2023-0170958, filed on Nov. 30, 2023, the contents of which are all incorporated by reference herein in its entirety.

BACKGROUND

1. Field

The present disclosure relates to an image display apparatus, and more particularly, to an image display apparatus capable of stably operating a signal processing device and a micom in the signal processing device during supply of input alternating current voltage.

2. Description of the Related Art

An image display apparatus is an apparatus that displays images.

Recently, in keeping with the increase in image resolution and the increase in image sharpness, the display resolution or peak luminance of a display in an image display apparatus is increasing.

Incidentally, as the display resolution or peak luminance of a display becomes higher, the consumption of power supplied to the display becomes higher.

In this regard, research is being conducted on methods for reducing the power consumption of the image display apparatus. In particular, various research attempts are being made to reduce power consumption in a standby mode or a display mode.

SUMMARY

An object of the present disclosure is to provide an image display apparatus capable of stably operating a signal processing device and a micom in the signal processing device during supply of input alternating current voltage.

Another object of the present disclosure is to provide an image display apparatus capable of reducing power consumption in a standby mode.

Yet another object of the present disclosure is to provide an image display apparatus capable of implementing a plurality of standby modes and reducing power consumption in each standby mode.

An embodiment of the present disclosure provides an image display apparatus comprising: a display; a relay configured to switch an input AC voltage; a first converter connected to the relay, and configured to convert the input AC voltage into a DC voltage; a second converter spaced apart from the relay, and configured to convert the input AC voltage into a DC voltage; a first micom configured to operate based on the DC voltage from the second converter; a signal processing device including a second micom, and configured to output a video signal to the display; a first switch disposed between the second converter and the second micom; and a second switch disposed between the first converter and the signal processing device.

Meanwhile, when the input AC voltage is inputted at a first time after a period of time in which the input AC voltage is not inputted, the first micom may be configured to turn on the first switch and the second switch together after the first converter is operated.

Meanwhile, when the input AC voltage is inputted at the first time after a period of time in which the input AC voltage is not inputted, the first micom may be configured to operate the second converter, operate the first converter after the second converter is operated, and turn on the first switch and the second switch together after the first converter is operated.

Meanwhile, when the input AC voltage is inputted at the first time after a period of time in which the input AC voltage is not inputted, the first micom may be configured to operate the second converter, and, after the second converter is operated, control the second converter to output a first level voltage when the first converter is operated.

Meanwhile, when the input AC voltage is inputted at the first time after a period of time in which the input AC voltage is not inputted, the first micom may be configured to turn on the first switch and the second switch together after the first converter and the second converter are operated, and turn off only the first converter among the first converter and the second converter after a predetermined period of time.

Meanwhile, after the first converter is turned off, the first micom may be configured to turn off the first switch and the second switch together.

Meanwhile, after the first converter is turned off, the first micom may be configured to turn off the first switch and the second switch together, and control the second converter to output a second level voltage lower than the first level.

Meanwhile, after the first converter is turned off, the first micom may be configured to turn off the first switch and turn on the second switch.

Meanwhile, after the first converter is turned off, the first micom may be configured to turn off the first switch, turn on the second switch, and the second converter to output the first level voltage.

Meanwhile, in a display mode, the first micom may be configured to control the second converter to output the first level voltage and operate the first converter and the first switch.

Meanwhile, in the display mode, the first micom may be configured to turn off the second switch.

Meanwhile, when the input AC voltage is inputted at the first time after a period of time in which the input AC voltage is not inputted, the first micom may be configured to turn on the first switch and the second switch together after the second converter and the first converter are operated, execute a first standby mode after a predetermined period of time, and execute a second standby mode in response to a power on input while executing the first standby mode.

Meanwhile, the first micom may be configured to execute a display mode after executing the second standby mode.

Meanwhile, based on the first standby mode, the first micom may be configured to turn off the first converter, turn off the first switch and the second switch together after the first converter is turned off, and control the second converter to output a second level voltage lower than the first level.

Meanwhile, according to the second standby mode, the first micom may be configured to turn off the first converter, turn off the first switch and turn on the second switch after the first converter is turned off, and control the second converter to output the first level voltage.

Meanwhile, based on the display mode, the first micom may be configured to control the second converter to output the first level voltage and operate the first converter and the first switch.

Meanwhile, the image display apparatus may further comprise: a first dc/dc converter disposed between the first switch and the second micom; and a second dc/dc converter disposed between the second switch and the signal processing device.

Meanwhile, the image display apparatus may further comprise: a first dc/dc converter disposed between the first switch and the second micom; a second dc/dc converter disposed between the second switch and the signal processing device; and a voltage step-down device disposed between the second converter and the first micom.

Another embodiment of the present disclosure provides an image display apparatus comprising: a display; a first circuit board including a relay configured to switch an input AC voltage, a first converter connected to the relay, and configured to convert the input AC voltage into a DC voltage, and a second converter spaced apart from the relay, and configured to convert the input AC voltage into a DC voltage; and a second circuit board including a first micom configured to operate based on the DC voltage from the second converter, a signal processing device including a second micom, and configured to output a video signal to the display, a first switch disposed between the second converter and the second micom, and a second switch disposed between the first converter and the signal processing device, wherein a first power line is disposed between the first converter and the second switch, and a second power line is disposed between the second converter and the first switch.

Meanwhile, in a display mode, the signal processing device may be configured to operate based on a DC voltage inputted through the first power line, in a first standby mode, the first micom may be configured to operate based on a DC voltage inputted through the second power line, and in a second standby mode, the second micom in the signal processing device may be configured to operate based on a DC voltage inputted through the second power line.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
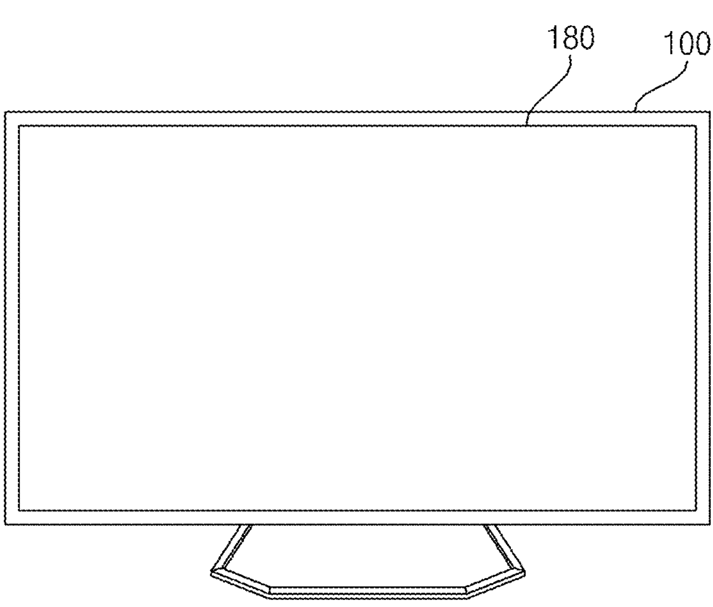
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may include a display 180.

The display resolution of the display 180 is getting higher and higher from 2K to 4K to 8K to 16K and higher, and the peak luminance of the display 180 is also increasing. Accordingly, the consumption of power supplied to the display 180 becomes higher.

Meanwhile, the display 180 may be implemented by one of various panels. For example, the display 180 may be one of a liquid crystal display panel (LCD panel), an organic light-emitting panel (OLED panel), and an inorganic light-emitting panel (LED panel).

The liquid crystal display panel may require a backlight in addition to a panel for image display.

On the other hand, the organic light-emitting panel or the inorganic light-emitting panel requires no backlight for image display.

Meanwhile, the image display apparatus 100 according to an embodiment of the present disclosure includes a display 180, a signal processing device (170 in FIG. 2) that internally has a second micom 174 and outputs a video signal to the display 180, a first converter (910 in FIG. 9) that converts an input AC voltage (Va in FIG. 9) inputted through a relay (RL in FIG. 9) into a DC voltage, a second converter (925 in FIG. 9) that converts an input AC voltage inputted without passing through the relay (RL in FIG. 9) into a DC voltage, a first micom (173 in FIG. 9) configured to operate based on the DC voltage from the second converter 925, a first switch 912 disposed between the second converter 925 and the second micom 174, and a second switch 914 disposed between the first converter 910 and the signal processing device 170.

In particular, when the input AC voltage Va is inputted at a first time after a period of time in which the input AC voltage Va is not inputted, the image display apparatus 100 according to an embodiment of the present disclosure controls the first switch 912 and the second switch 914 to be turned on together after the first converter 910 is operated.

Accordingly, it is possible to stably operate the signal processing device 170 and the micom 174 in the signal processing device 170 during supply of the input AC voltage Va. Meanwhile, it is possible to reduce power consumption in a standby mode. In particular, it is possible to implement a plurality of standby modes and reduce power consumption in each standby mode.

Meanwhile, the image display apparatus 100 according to another embodiment of the present disclosure includes a display 180, a first circuit board PBO including a relay RL configured to switch an input AC voltage Va, a first converter 910 connected to the relay RL, that converts the input AC voltage Va into a DC voltage, and a second converter 925 spaced apart from the relay RL, that converts the input AC voltage Va into a DC voltage, and a second circuit board MBO including a first micom 173 configured to operate based on the DC voltage from the second converter 925, a signal processing device 170 including a second micom 174, and configured to output a video signal to the display 180, a first switch 912 disposed between the second converter 925 and the second micom 174, and a second switch 914 disposed between the first converter 910 and the signal processing device 170.

Meanwhile, a first power line LNa is disposed between the first converter 910 and the second switch 914, and a second power line LNb is disposed between the second converter 925 and the first switch 912.

Accordingly, it is possible to stably operate the signal processing device 170 and the micom 174 in the signal processing device 170 during supply of the input AC voltage Va. Meanwhile, it is possible to reduce power consumption in a standby mode. In particular, it is possible to implement a plurality of standby modes and reduce power consumption in each standby mode.

Meanwhile, the image display apparatus 100 of FIG. 1 may be a TV, a monitor, a tablet PC, a mobile terminal, or the like.

Figure 2:
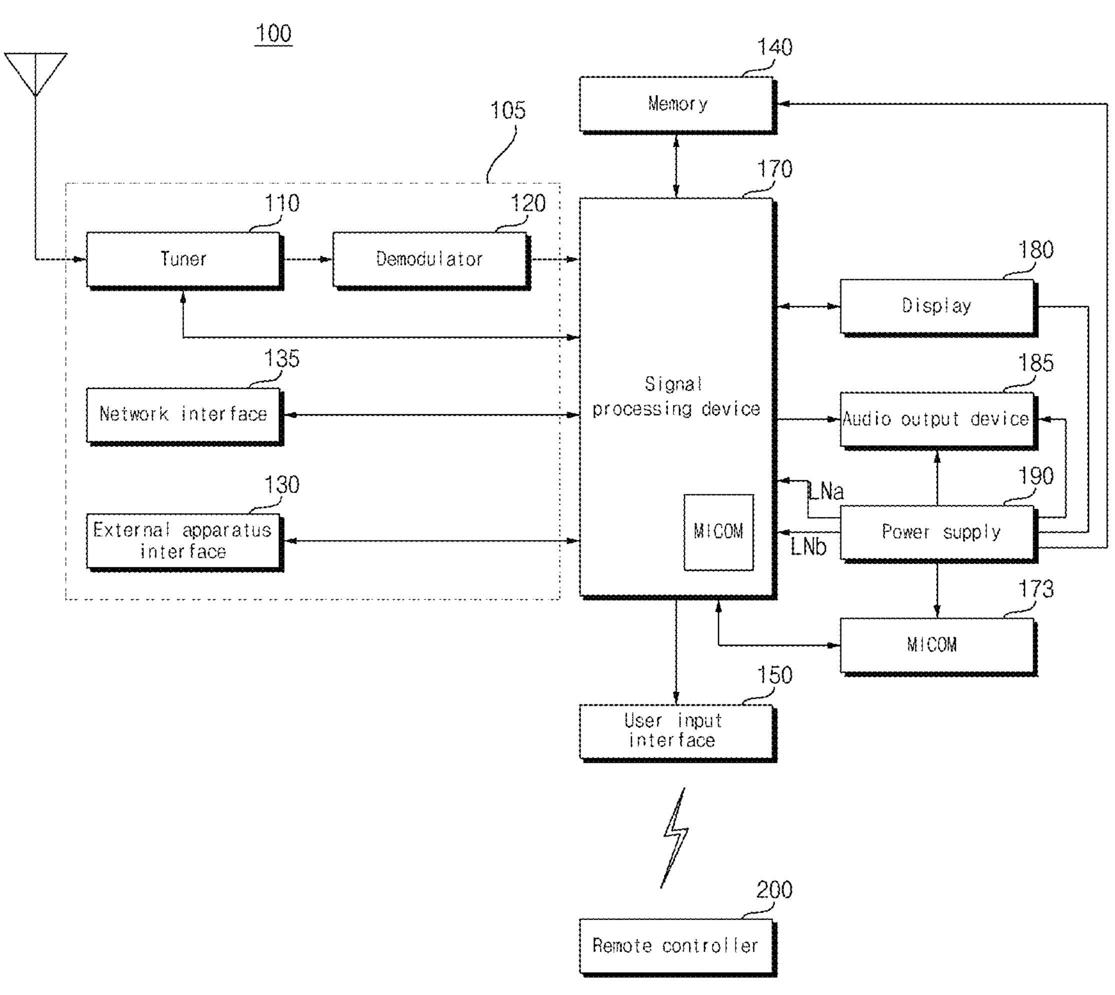
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external device interface 130, a memory 140, a user input interface 150, a sensor device (not shown), a signal processing device 170, a display 180, and an audio output device 185.

The image display device 100 according to an embodiment of the present disclosure may further include a power supply 190 and a first micom 173.

Meanwhile, the signal processing device 170 may include a second micom 174.

Meanwhile, a first power line (LNa) and a second power line (LNb) may be disposed between the power supply 190 and the signal processing device 170.

At this time, the second micom 174 in the signal processing device 170 may operate based on the direct current voltage input through the second power line LNb.

The image receiver 105 may include a tuner 110, a demodulator 120, a network interface 135, and an external device interface 130.

Meanwhile, unlike the figure, the image receiver 105 may include only the tuner 110, the demodulator 120, and the external device interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, when the selected RF broadcast signal is a digital broadcast signal, the tuner 110 converts the digital broadcast signal into a digital WHEN (DIF) signal and, when the selected RF broadcast signal is an analog broadcast signal, the tuner 110 converts the analog broadcast signal into an analog baseband image or voice (CVBS/SIF) signal. That is, the tuner 110 may process a digital broadcast signal or an analog broadcast signal. The analog baseband image or voice (CVBS/SIF) signal output from the tuner 110 may be directly input to the signal processing device 170.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital WHEN signal DWHEN from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may include an A/V input and output device (not shown).

The external device interface 130 may be connected in wired or wirelessly to an external apparatus, such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processing device 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be included in the signal processing device 170.

The user input interface 150 transmits a signal input by the user to the signal processing device 170 or transmits a signal from the signal processing device 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a processed image signal. The image signal processed by the signal processing device 170 is input to the display 180, and may be displayed as an image corresponding to the image signal. In addition, the image signal processed by the signal processing device 170 may be input to the external output apparatus through the external device interface 130.

The audio signal processed by the signal processing device 170 may be output to the audio output device 185 as an audio signal. In addition, audio signal processed by the signal processing device 170 may be input to the external output apparatus through the external device interface 130.

Although not shown in FIG. 2, the signal processing device 170 may include a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 may be configured to control the overall operation of the image display apparatus 100. For example, the signal processing device 170 may be configured to control the tuner 110 to control the tuning of the RF broadcast corresponding to the channel selected by the user or the previously stored channel.

In addition, the signal processing device 170 may be configured to control the image display apparatus 100 according to a user command input through the user input interface 150 or an internal program.

Meanwhile, the signal processing device 170 may be configured to control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external device interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which may be implemented in the form of a system on chip (SOC), a display 180 for displaying an image, and an audio output device 185 for outputting an audio.

Specifically, the power supply 190 may include an AC/DC converter to convert an AC power into a DC voltage, and a DC/DC converter to convert the level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

Figure 3:
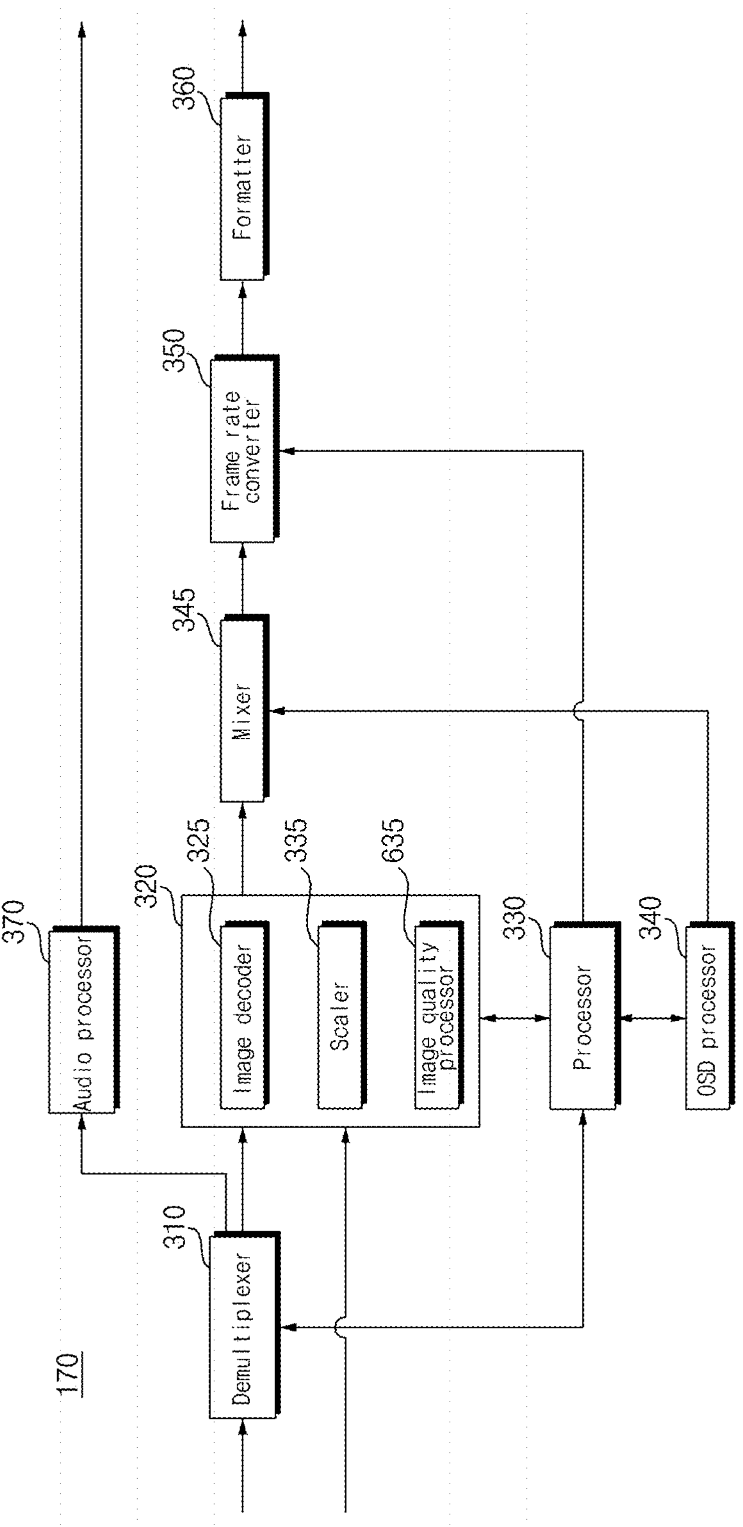
FIG. 3 is an example of an internal block diagram of a signal processing device of FIG. 2.

FIG. 3 is an example of an internal block diagram of the signal processing device in FIG. 2.

Referring to the figure, the signal processing device 170 according to an embodiment of the present disclosure may include a demultiplexer 310, an image processor 320, a processor 330, and an audio processor 370. In addition, the signal processing device 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, when the size or resolution of an input image signal is small, the scaler 335 may upscale the input image signal, and, when the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processing device, and the OSD processor 340 may include such a pointing signal processing device (not shown).

Obviously, the pointing signal processing device (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

Further, the formatter 360 may convert the format of an image signal. For example, the formatter 360 may convert the format of a 3D image signal into one of various 3D formats, including a side-by-side format, a top/down format, a frame sequential format, an interlaced format, a checker box format, etc.

The processor 330 may be configured to control overall operations of the image display apparatus 100 or the signal processing device 170.

For example, the processor 330 may be configured to control the tuner 110 to control the tuning of an RF broadcast corresponding to a channel selected by a user or a previously stored channel.

In addition, the processor 330 may be configured to control the image display apparatus 100 according to a user command input through the user input interface 150 or an internal program.

In addition, the processor 330 may transmit data to the network interface 135 or to the external device interface 130.

In addition, the processor 330 may be configured to control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

Figure 4A:
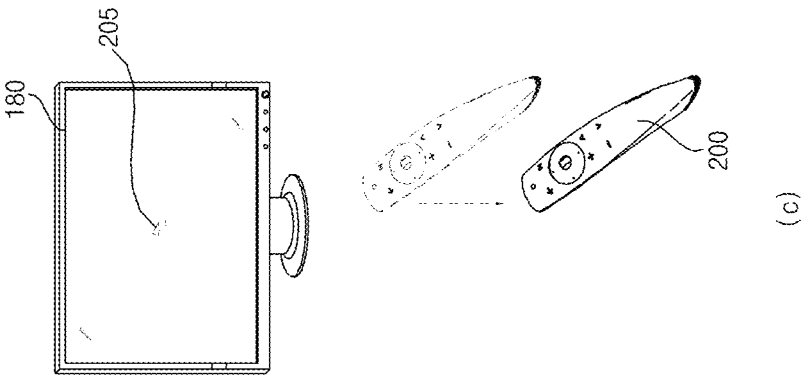
FIG. 4A is a diagram showing a method of controlling a remote controller of FIG. 2.
Figure 4A:
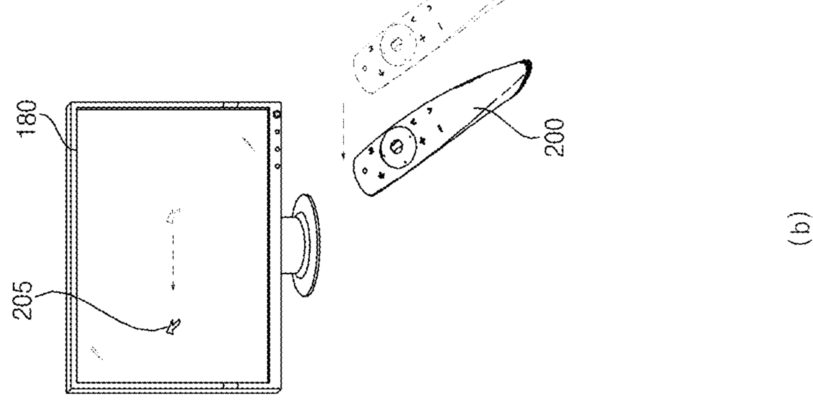
Figure 4A:
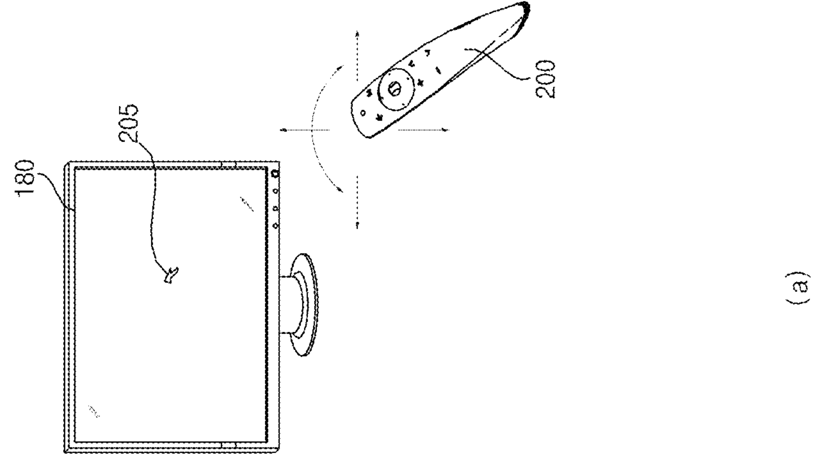

FIG. 4A is a diagram illustrating a control method of a remote controller of FIG. 2.

As shown in FIG. 4A (a), it is illustrated that a pointer 205 corresponding to the remote controller 200 is displayed on the display 180.

The user may move or rotate the remote controller 200 up and down, left and right (FIG. 4A (b)), and back and forth (FIG. 4A (c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A (b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A (c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
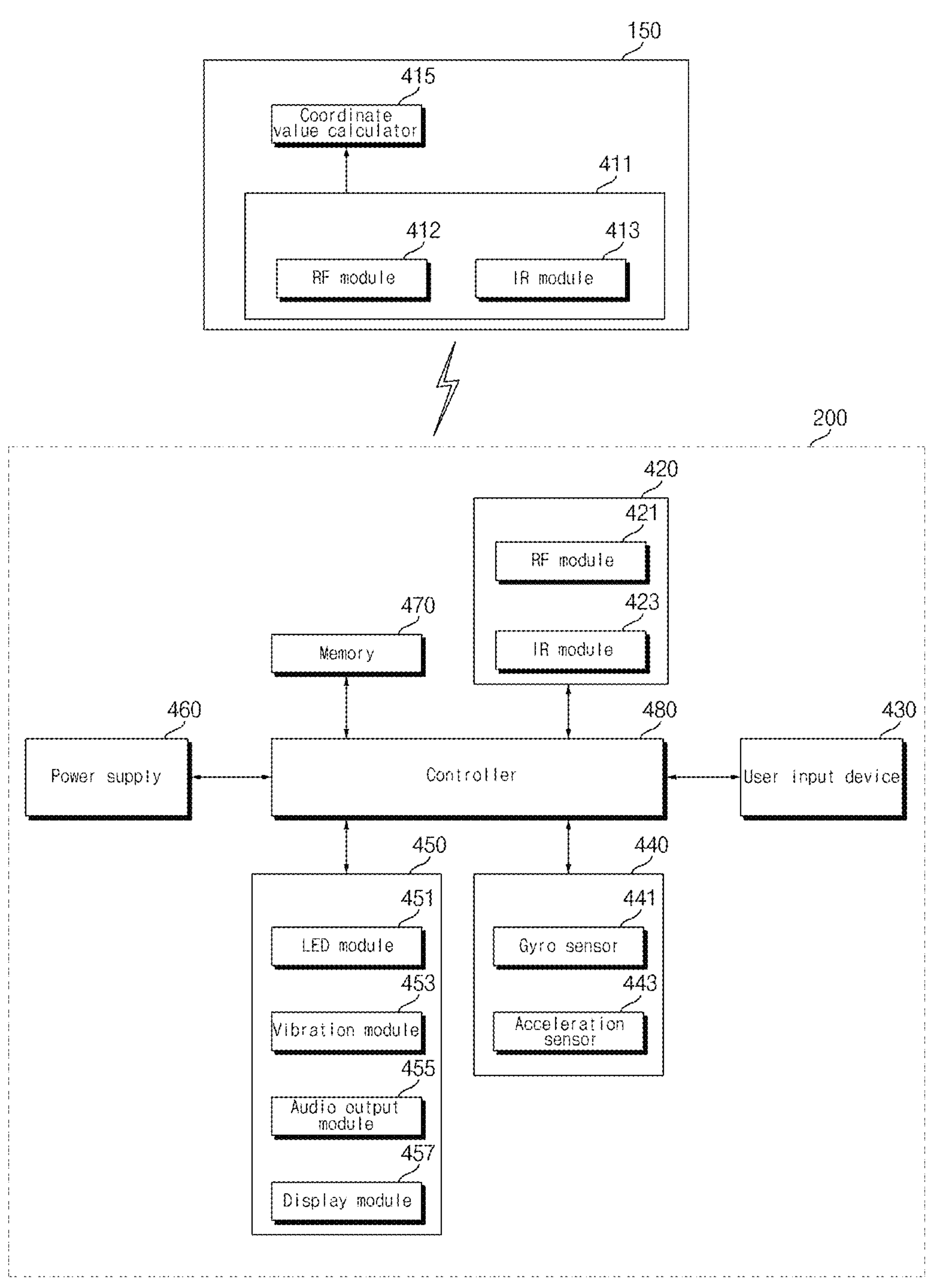
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, when necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may be configured to operate the user input device 435 to input a command related to the image display apparatus 100 to the remote controller 200. When the user input device 435 includes a hard key button, the user may input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means, such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. When the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the figure, the coordinate value calculator 415 may be provided in the signal processing device 170, not in the user input interface 150.

Figure 5:
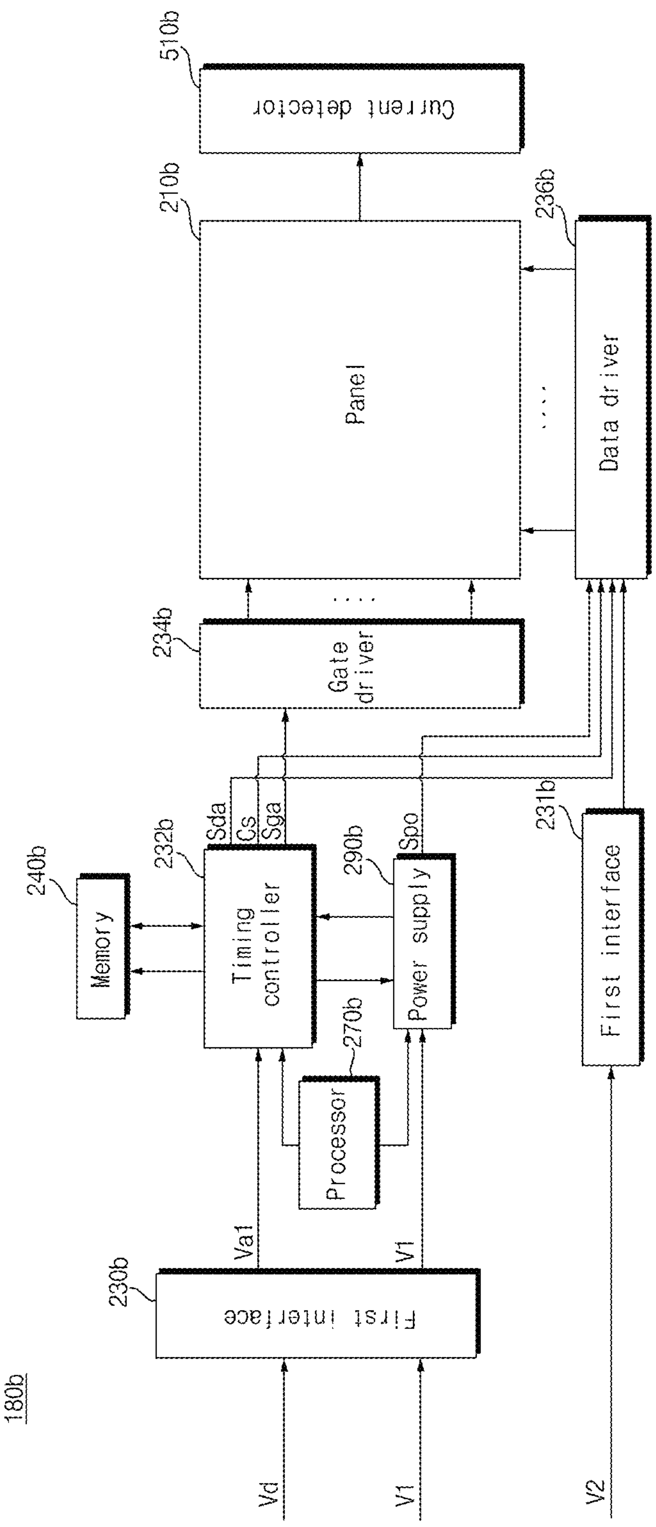
FIG. 5 is an exemplary internal block diagram of a display of FIG. 2.

FIG. 5 is an exemplary internal block diagram of a display of FIG. 2.

Referring to FIG. 5, an organic light-emitting panel-based display 180*b* may include an organic light-emitting panel 210*b*, a first interface 230*b*, a second interface 231*b*, a timing controller 232*b*, a gate driver 234*b*, a data driver 236*b*, a memory 240*b*, a processor 270*b*, a power supply 290*b*, a current detector 510*b*, and the like.

The display 180*b* receives an image signal Vdb, a first DC voltage V1*b*, and a second DC voltage V2*b*, and may display a certain image based on the image signal Vdb.

Meanwhile, the first interface 230*b* in the display 180*b* may receive the image signal Vdb and the first DC voltage V1*b* from the signal processing device 170*b*.

Here, the first DC voltage V1*b* may be used for the operation of the power supply 290*b* and the timing controller 232*b* in the display 180*b*.

Next, the second interface 231*b* may receive a second DC voltage V2*b* from an external power supply 190*b*. Meanwhile, the second DC voltage V2*b* may be input to the data driver 236*b* in the display 180*b*.

The timing controller 232*b* may output a data driving signal Sdab and a gate driving signal Sgab, based on the image signal Vdb.

For example, when the first interface 230*b* converts the input image signal Vdb and outputs the converted image signal valb, the timing controller 232*b* may output the data driving signal Sdab and the gate driving signal Sgab based on the converted image signal valb.

The timing controller 232*b* may further receive a control signal, a vertical synchronization signal Vsyncb, and the like, in addition to the image signal Vdb from the signal processing device 170*b*.

In addition to the image signal Vdb, based on a control signal, a vertical synchronization signal Vsyncb, and the like, the timing controller 232*b* generates a gate driving signal Sgab for the operation of the gate driver 234*b*, and a data driving signal Sdab for the operation of the data driver 236*b*.

At this time, when the panel 210*b* includes a RGBW subpixel, the data driving signal Sdab may be a data driving signal for driving of RGBW subpixel.

Meanwhile, the timing controller 232*b* may further output a control signal Csb to the gate driver 234*b*.

The gate driver 234*b* and the data driver 236*b* supply a scan signal and an image signal to the organic light-emitting panel 210*b* through a gate line GLb and a data line DLb, respectively, according to the gate driving signal Sgab and the data driving signal Sdab from the timing controller 232*b*. Accordingly, the organic light-emitting panel 210*b* displays a certain image.

Meanwhile, the panel 210*b* may include an organic light emitting layer. In order to display an image, a plurality of gate lines GLb and data lines DLb may be disposed in a matrix form in each pixel corresponding to the organic light emitting layer.

Meanwhile, the data driver 236*b* may output a data signal to the organic light-emitting panel 210*b* based on a second DC voltage V2*b* from the second interface 231*b*.

The power supply 290*b* may supply various power supplies to the gate driver 234*b*, the data driver 236*b*, the timing controller 232*b*, and the like.

The current detector 510*b* may detect the current flowing in a sub-pixel of the panel 210*b*. The detected current may be input to the processor 270*b* or the like, for a cumulative current calculation.

The processor 270*b* may perform each type of control of the display 180*b*. For example, the processor 270*b* may be configured to control the gate driver 234*b*, the data driver 236*b*, the timing controller 232*b*, and the like.

Meanwhile, the processor 270*b* may receive current information flowing in a sub-pixel of the panel 210*b* from the current detector 510*b*.

Figure 6A:
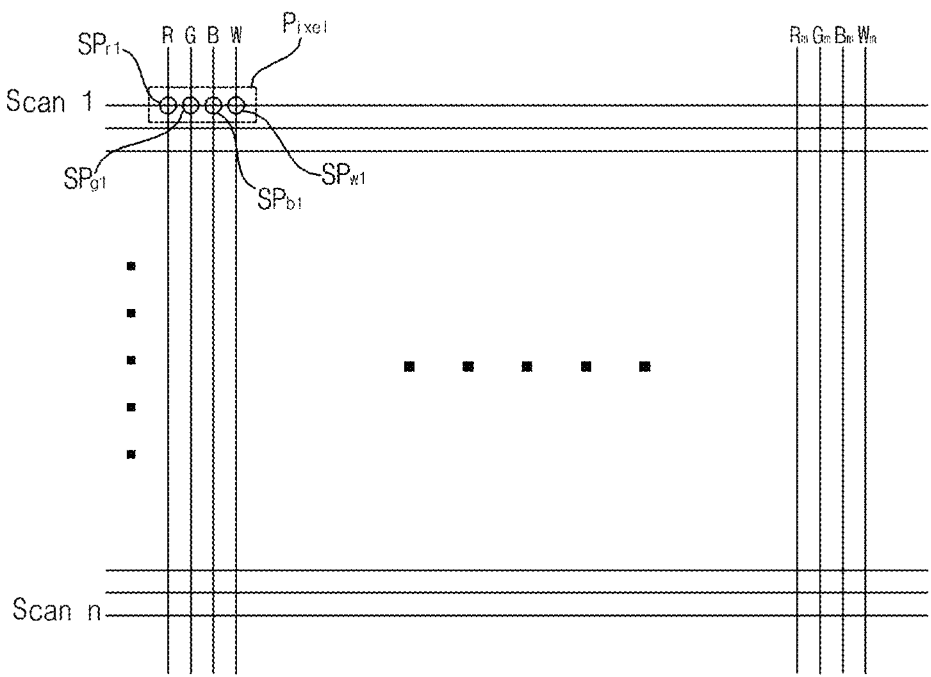
FIGS. 6A and 6B are diagrams referred to in the description of an organic light-emitting panel of FIG. 5.
Figure 6B:
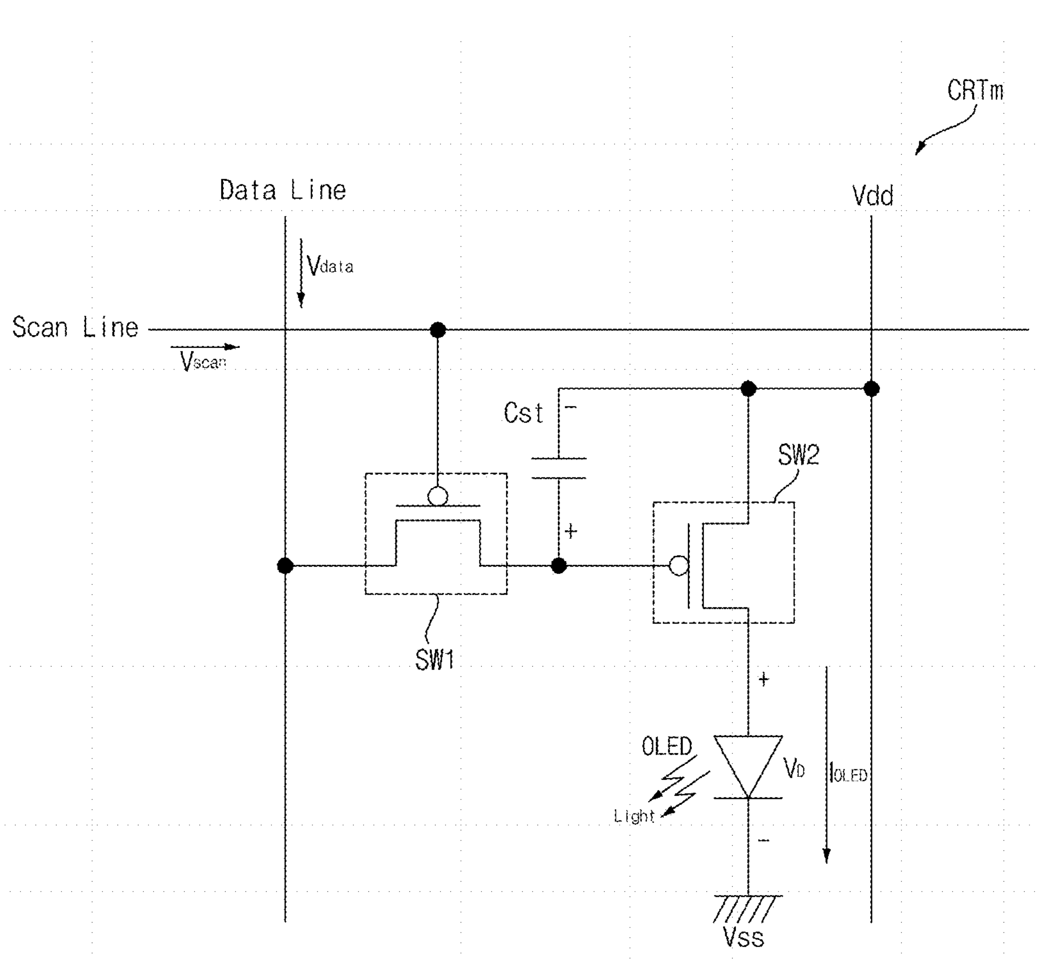

FIGS. 6A and 6B are diagrams referred to in the description of an organic light-emitting panel of FIG. 5.

First, FIG. 6A is a diagram illustrating a pixel in the organic light-emitting panel 210*b*.

Referring to the figure, the organic light-emitting panel 210*b* may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light-emitting panel 210*b*. In the figure, a pixel including subpixels SR1, SG1, SB1, and SW1 of RGBW is shown.

FIG. 6B illustrates a circuit of any one sub-pixel in the pixel of the organic light-emitting panel of FIG. 6A.

Referring to the figure, an organic light-emitting sub pixel circuit CRTm may include, as an active type, a scan switching element SW1, a storage capacitor Cst, a drive switching element SW2, and an organic light emitting layer OLED.

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC voltage (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a pulse width modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like. Meanwhile, the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the figure, it is illustrated that a p-type MOSFET is used for a scan switching element SW1 and a drive switching element SW2, but an n-type MOSFET or other switching element, such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7A:
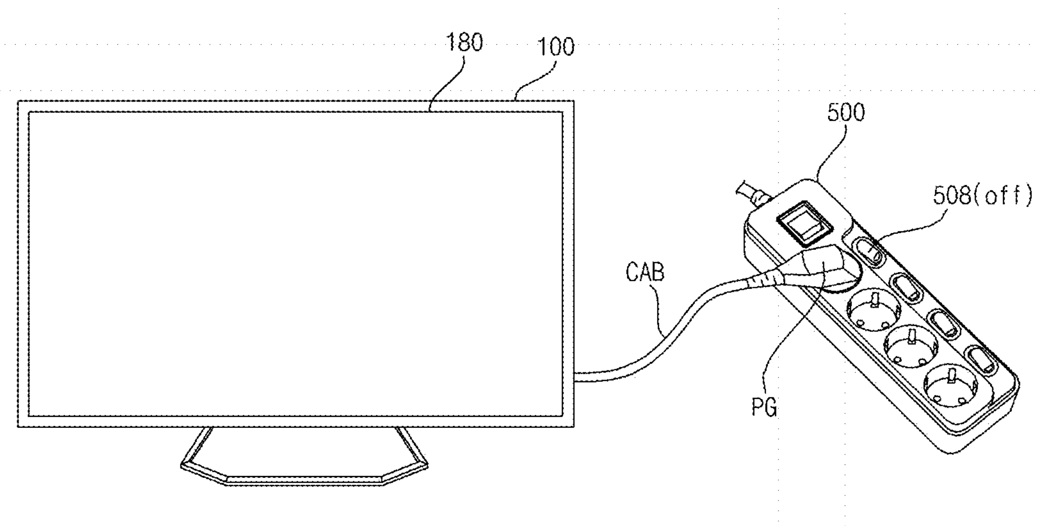
FIGS. 7A and 7B are diagrams illustrating the supply and discontinuation of input AC voltage to the image display apparatus.
Figure 7B:
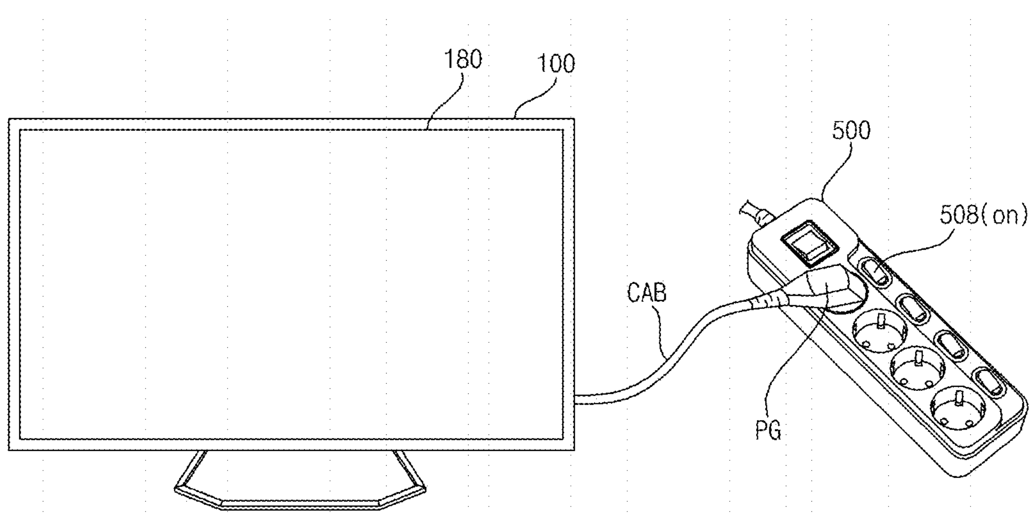

FIGS. 7A and 7B are diagrams illustrating the discontinuation and supply of input AC voltage to the image display apparatus.

First, FIG. 7A is a diagram illustrating the discontinuation of input AC voltage to the image display apparatus.

Referring to the drawing, the image display apparatus 100 may be electrically connected to a power inlet (not shown) for supplying AC voltage or a power strip 505 connected to the power inlet, through a power cable CAB and a plug PG.

In the drawing, the image display apparatus 100 is illustrated as being electrically connected to the power strip 505 connected to the power inlet, through the power cable CAB and the plug PG.

Meanwhile, when a switch 508 in the power strip 505 is turned off, the supply of the input AC voltage Va to the image display apparatus 100 is discontinued.

Next, FIG. 7B is a diagram illustrating the supply of input AC voltage to the image display apparatus.

Referring to the drawing, when the switch 508 in the power strip 505 is turned on, an input AC voltage Va is supplied to the image display apparatus 100.

Meanwhile, when the input AC voltage Va is supplied to the image display apparatus 100 after discontinuation, the image display apparatus 100 may be configured to execute in an AC supply mode or an AC on mode for a predetermined period of time.

For example, according to the AC supply mode or the AC on mode, the image display apparatus 100 may supply a DC voltage to the first micom 173, the signal processing device 170, the second micom 174 in the signal processing device 170, etc. for a predetermined period of time.

Figure 8A:
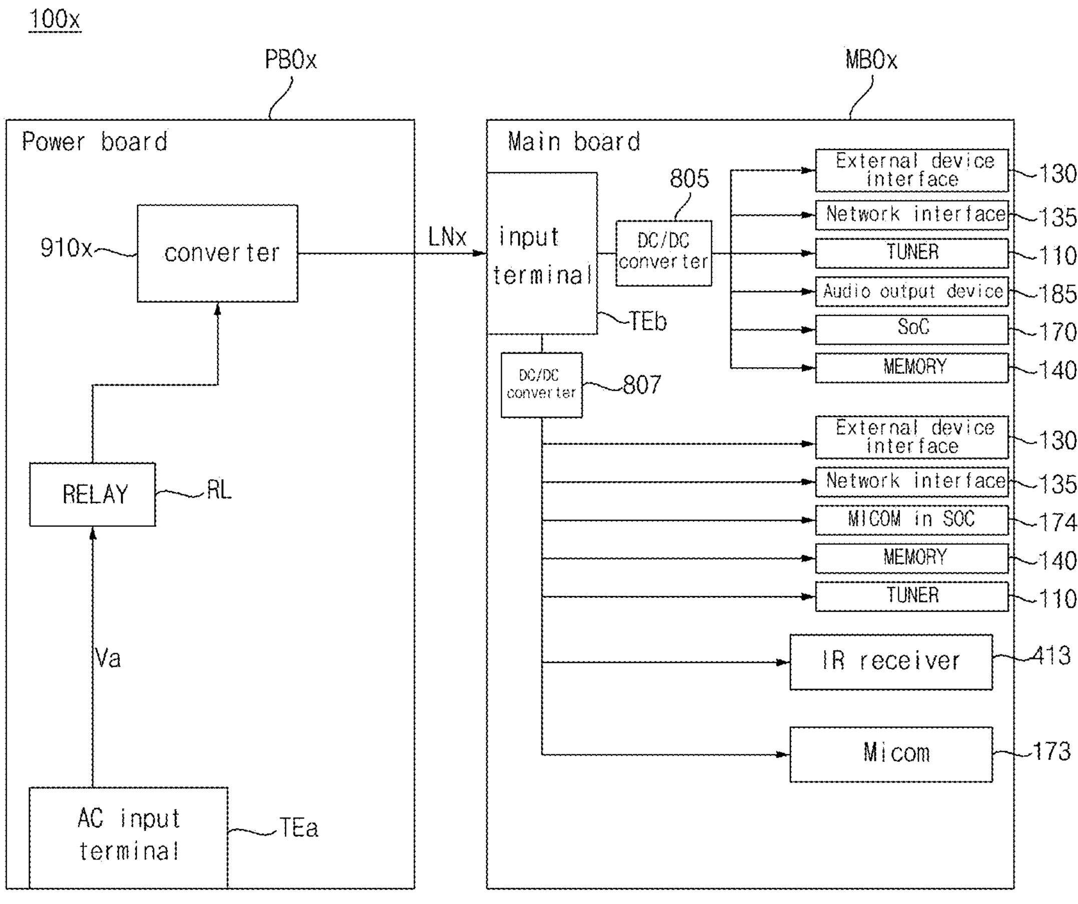
FIG. 8A is an exemplary internal block diagram of an image display apparatus related to the present disclosure.

FIG. 8A is an exemplary internal block diagram of an image display apparatus related to the present disclosure.

Referring to the drawing, the image display apparatus 100*x* related to the present disclosure may include a power board PBOx and a main board MBOx.

The power board PBOx may include a first input terminal TEa for receiving an input AC voltage, a relay RL configured to switch the input AC voltage Va inputted through the first input terminal TEa, and a first converter 910*x* that converts the input AC voltage Va inputted through the relay RL into a DC voltage.

The main board MBOx may include a second input terminal TEb for receiving a DC voltage from the power board PBOx through a power line LNx and a first dc/dc converter 807 and a second dc/dc converter 805 that perform level conversion based on the DC voltage from the second input terminal TEb.

Meanwhile, the first dc/dc converter 807 and the second dc/dc converter 805 may be connected in parallel.

Meanwhile, the first dc/dc converter 807 may be configured to operate in a standby mode, and may output each converted DC voltage to the network interface 135, the external device interface 130, the memory 140, the micom 174 in the signal processing device 170, and the tuner 110.

Meanwhile, the first dc/dc converter 807 may be configured to operate in a standby mode, and may further output each converted DC voltage to the first micom 173, the IR receiver 413, etc.

Meanwhile, in a display mode, the first dc/dc converter 807 may output a DC voltage to the micom 174 in the signal processing device 170.

Meanwhile, the second dc/dc converter 809 may be configured to operate in a display mode, and may output each converted DC voltage to the network interface 135, the external device interface 130, the memory 140, the signal processing device 170, the tuner 110, and the audio output device 185.

Meanwhile, according to the image display apparatus 100*x* in FIG. 8A, in a standby mode, the first converter 910*x* and the first dc/dc converter 807 are operated, and therefore a considerable amount of power is consumed.

Figure 8B:
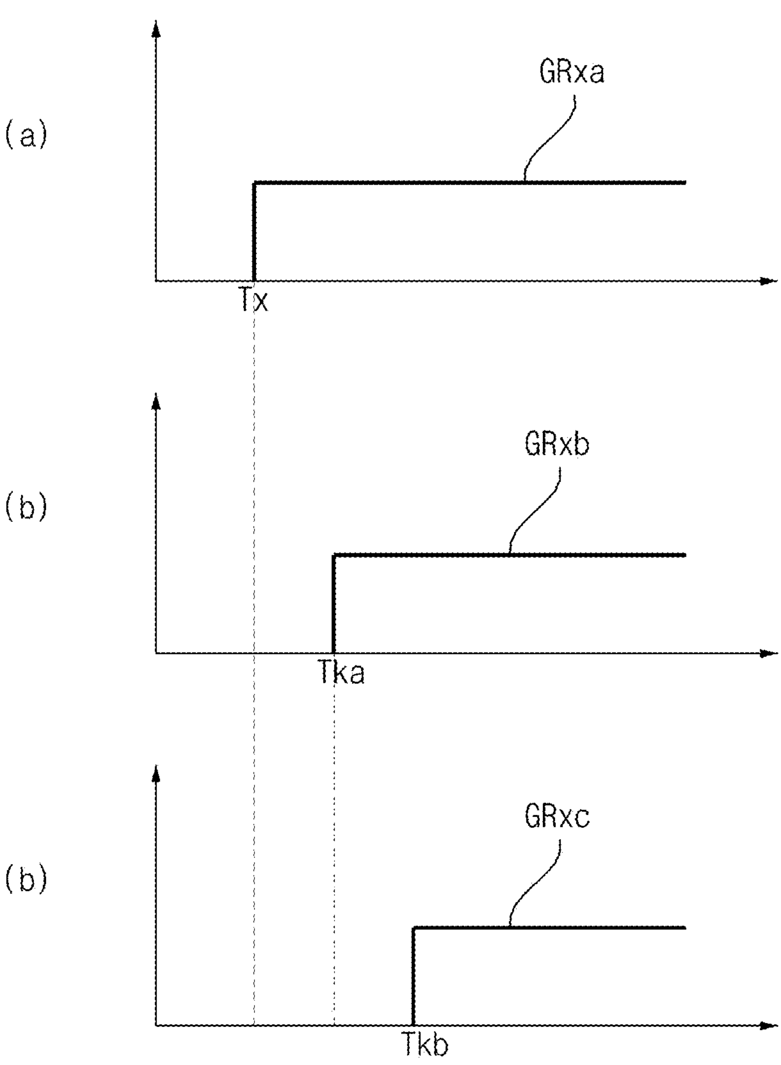
FIG. 8B is a diagram referred to in the description of FIG. 8A.

Moreover, according to the image display apparatus 100*x* in FIG. 8A, in a display mode or an AC supply mode or an AC on mode, a DC voltage from the second dc/dc converter 809 is supplied to the signal processing device 170, and a DC voltage from the first dc/dc converter 807 is supplied to the micom 174 in the signal processing device 170, but there is the problem that each DC voltage is supplied at a different timing. FIG. 8B is a diagram referred to in the description of FIG. 8A.

Referring to the drawing, when an input AC voltage Va is inputted into the image display apparatus 100*x* in FIG. 8A at time Tx, the first converter 910*x* may be operated, and afterwards, the first dc/dc converter 807 and the second dc/dc converter 809 may be operated individually.

In particular, according to an AC supply mode or an AC on mode, the image display apparatus 100*x* may supply a DC voltage to the first micom 173, the signal processing device 170, the second micom 174 in the signal processing device 170, etc. for a predetermined period of time after time Tx.

In the drawing, GRxa illustrates that the input AC voltage Va is supplied at time Tx, GRxb illustrates that the DC voltage from the first dc/dc converter 807 is supplied at time Tka after time Tx, and GRxc illustrates that the DC voltage from the second dc/dc converter 805 is supplied at time Tkb after time Tka.

As such, in the AC supply mode or the AC on mode, the timing Tkb at which the DC voltage from the second dc/dc converter 809 is supplied to the signal processing device 170 and the timing Tka at which the DC voltage from the first dc/dc converter 807 is supplied to the micom 174 in the signal processing device 170 are different. Thus, the signal processing device 170 is not be able to operate stably.

In particular, during the period from Tka to Tkb, the signal processing device 170 operates unstably.

Figure 8C:
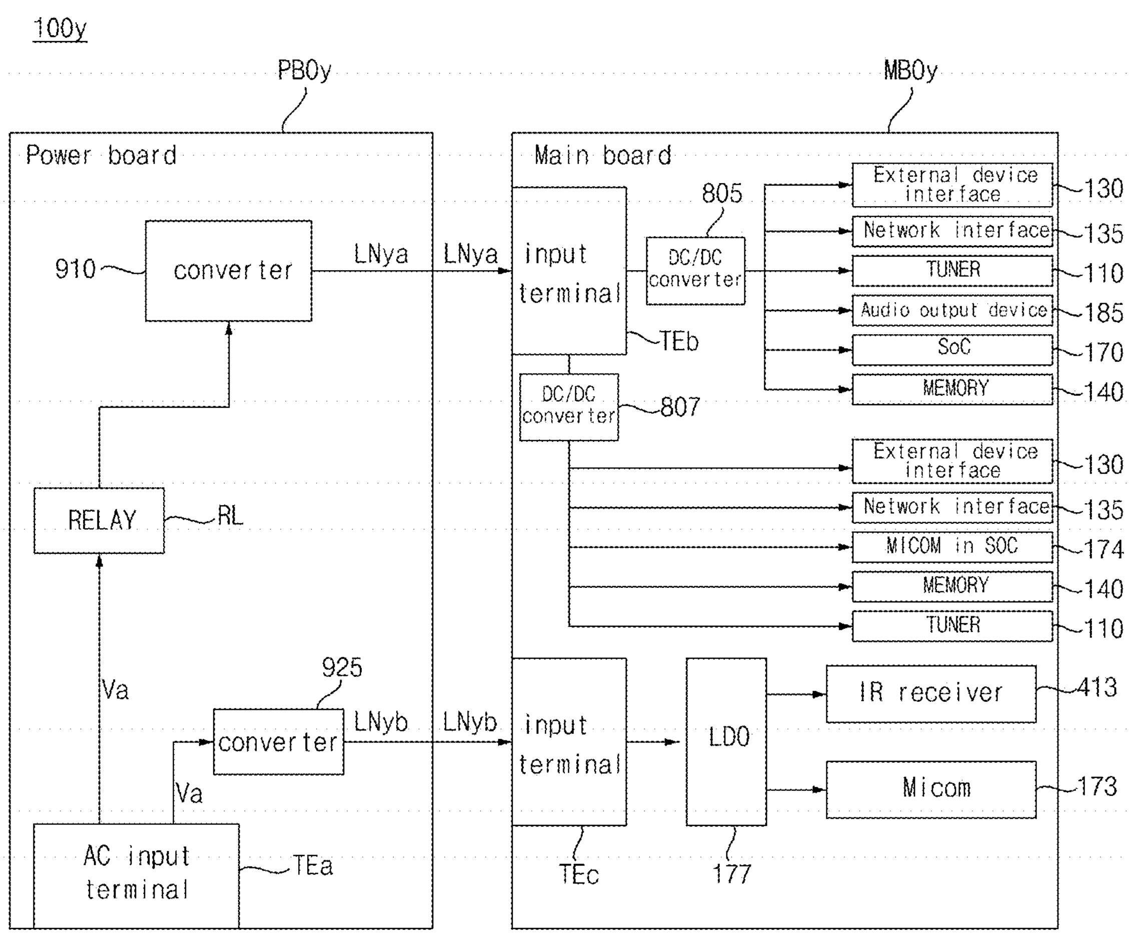
FIG. 8C is another exemplary internal block diagram of an image display apparatus related to the present disclosure.

FIG. 8C is another exemplary internal block diagram of an image display apparatus related to the present disclosure.

Referring to the drawing, the image display apparatus 100*y* related to the present disclosure may include a power board PBOy and a main board MBOy.

The power board PBOy may include a first input terminal TEa for receiving an input AC voltage Va, a relay RL configured to switch the input AC voltage Va inputted through the first input terminal TEa, a first converter 910 that converts an input AC voltage Va inputted through the relay RL into a first DC voltage, and a second converter 925 that converts an input AC voltage Va inputted without passing through the relay RL into a second DC voltage.

The main board MBOy may include a second input terminal TEb for receiving a first DC voltage from the power board PBOy through a first power line LNya, and a first dc/dc converter 807 and a second dc/dc converter 805 that perform level conversion based on the first DC voltage from the second input terminal TEb.

The main board MBOy may further include a third input terminal TEc for receiving a second DC voltage from the power board PBOy through a second power line LNyb and a voltage step-down device 177 that steps down the second DC voltage from the third input terminal TEc.

Meanwhile, the first dc/dc converter 807 and the second dc/dc converter 805 may be connected in parallel.

Meanwhile, in a first standby mode, the first converter 910 does not operate, but only the second converter 925 may be configured to operate.

Accordingly, in the first standby mode, the voltage step-down device 177 may step down the second DC voltage from the third input terminal TEc and output the stepped-down DC voltage to the first micom 173 and the IR receiver 413.

Meanwhile, the first standby mode may be referred to as a zero watt standby mode.

Meanwhile, in a second standby mode, the first converter 910 may be configured to operate.

Meanwhile, the first dc/dc converter 807 may be configured to operate in the second standby mode, and output each converted DC voltage to the network interface 135, the external device interface 130, the memory 140, the micom 174 in the signal processing device 170, and the tuner 110.

Meanwhile, in a display mode, the first dc/dc converter 807 may output a DC voltage to the micom 174 in the signal processing device 170.

Meanwhile, the second dc/dc converter 809 may be configured to operate in a display mode, and output each converted DC voltage to the network interface 135, the external device interface 130, the memory 140, the micom 174 in the signal processing device 170, the tuner 110, and the audio output device 185.

Meanwhile, according to the image display apparatus 100*y* in FIG. 8C, in the first standby mode, the first converter 910 does not operate, and therefore power consumption can be reduced.

However, according to the image display apparatus 100*y* in FIG. 8C, in the second standby mode, the first converter 910 and the first dc/dc converter 807 operate, and therefore a considerable amount of power is consumed. In particular, the operation of the first converter 910 leads to considerable power consumption.

Moreover, according to the image display apparatus 100*y* in FIG. 8C, in a display mode or an AC supply mode or an AC on mode, a DC voltage from the second dc/dc converter 809 is supplied to the signal processing device 170, and a DC voltage from the first dc/dc converter 807 is supplied to the micom 174 in the signal processing device 170, but there is the problem that each DC voltage is supplied at a different timing.

That is, as shown in FIG. 8B, when an input AC voltage Va is inputted at time Tx, the first converter 910 operates, and afterwards, the first dc/dc converter 807 and the second dc/dc converter 809 operate, and a DC voltage from the first dc/dc converter 807 may be supplied at time Tka after time Ty, and a DC voltage from the second dc/dc converter 805 may be supplied at time Tkb after time Tka.

As such, in the AC supply mode or the AC on mode, the timing Tkb at which the DC voltage from the second dc/dc converter 809 is supplied to the signal processing device 170 and the timing Tka at which the DC voltage from the first dc/dc converter 807 is supplied to the micom 174 in the signal processing device 170 are different. Thus, the signal processing device 170 is not be able to operate stably.

In particular, during the period from Tka to Tkb, the signal processing device 170 operates unstably.

Figure 9:
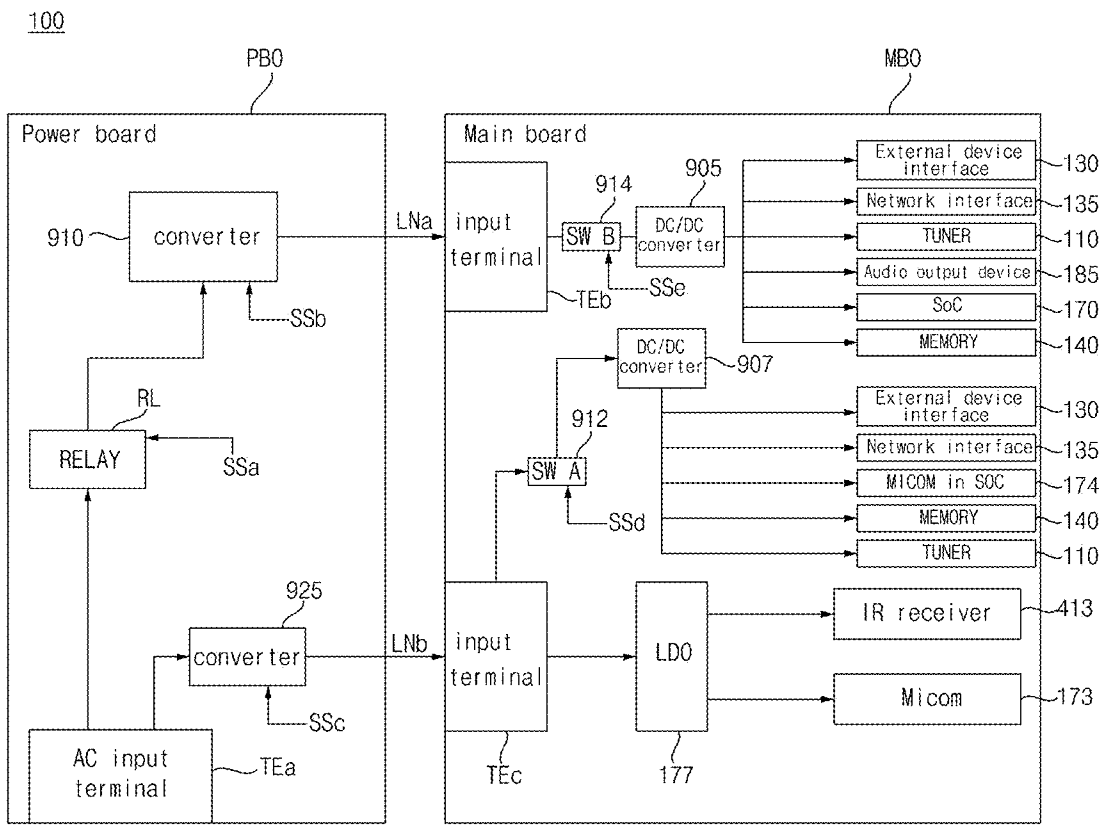
FIG. 9 is an exemplary circuit diagram of an image display apparatus according to an embodiment of the present disclosure.

FIG. 9 is an exemplary internal block diagram of an image display apparatus according to an embodiment of the present disclosure.

Referring to the drawing, the image display apparatus 100 according to the present disclosure includes a display 180, a signal processing device 170 that outputs a video signal to the display 180, and a power supply 190 that supplies a display driving voltage to the display 180.

That is, the image display apparatus 100 according to an embodiment of the present disclosure includes a display 180, a relay RL configured to switch an input AC voltage Va, a first converter 910 connected to the relay RL, that converts the input AC voltage Va into a DC voltage, a second converter 925 spaced apart from the relay RL, that converts the input AC voltage Va into a DC voltage, a first micom 173 configured to operate based on the DC voltage from the second converter 925, a signal processing device 170 including a second micom 174, and configured to output a video signal to the display 180, a first switch 912 disposed between the second converter 925 and the second micom 174, and a second switch 914 disposed between the first converter 910 and the signal processing device 170.

Accordingly, it is possible to stably operate the signal processing device 170 and the micom 174 in the signal processing device 170 during supply of the input AC voltage Va. Meanwhile, it is possible to reduce power consumption in a standby mode. In particular, it is possible to implement a plurality of standby modes and reduce power consumption in each standby mode.

Meanwhile, the image display apparatus 100 according to an embodiment of the present disclosure may further include a first dc/dc converter 907 disposed between the first switch 912 and the second micom 174 and a second dc/dc converter 905 disposed between the second switch 914 and the signal processing device 170. Accordingly, various DC voltages can be supplied.

Meanwhile, the image display apparatus 100 according to an embodiment of the present disclosure may further include a voltage step-down device 177 disposed between the second converter 925 and the first micom 173. Accordingly, various DC voltages can be supplied.

Meanwhile, the image display apparatus 100 according to an embodiment of the present disclosure may include a display 180, a first circuit board PBO, and a second circuit board MBO.

The first circuit board PBO is a power board, and includes a relay RL configured to switch an input AC voltage Va, a first converter connected to the relay RL, that converts the input AC voltage Va to a DC voltage, and a second converter 925 spaced apart from the relay RL, that converts the input AC voltage Va into a DC voltage.

On the other hand, the second circuit board MBO is a main board, and includes a first micom 173 configured to operate based on the DC voltage from the second converter 925, a signal processing device 170 including a second micom 174, and configured to output a video signal to the display 180, a first switch 912 disposed between the second converter 925 and the second micom 174, and a second switch 914 disposed between the first converter 910 and the signal processing device 170.

Meanwhile, the second circuit board MBO may further include a second input terminal TEb for receiving a first DC voltage from the power board PBO through a first power line LNa, a third input terminal TEc for receiving a second DC voltage from the power board PBO through a second power line LNb, and a voltage step-down device 177 that steps down the second DC voltage from the third input terminal TEc.

Meanwhile, the voltage step-down device 177 may be disposed between the second converter 925 and the first micom 173.

Meanwhile, the second circuit board MBO may further include a first dc/dc converter 907 disposed between the first switch 912 and the second micom 174 and a second dc/dc converter 905 disposed between the second switch 914 and the signal processing device 170.

Meanwhile, the first dc/dc converter 907 may perform level conversion based on the second DC voltage from the third input terminal TEc.

Meanwhile, the second dc/dc converter 905 may perform level conversion based on the first DC voltage from the second input terminal TEb.

Meanwhile, the first dc/dc converter 907 and the second dc/dc converter 905 may receive a DC voltage from different input terminals, as opposed to what is shown in FIG. 8A or FIG. 8C.

Also, the first dc/dc converter 907 may be connected to the first switch 912, and the second dc/dc converter 905 may be connected to the second switch 914.

Thus, the first dc/dc converter 907 and the second dc/dc converter 905 are separated from each other.

Accordingly, current paths based on operating the first dc/dc converter 907 and the second dc/dc converter 905 can be fully separated. Furthermore, different operations may be configured for the display mode and the second standby mode.

Meanwhile, only the voltage step-down device 177 may be configured to operate in the first standby mode, and only the second dc/dc converter 905 may be configured to operate in the second standby mode.

Meanwhile, both the first dc/dc converter 907 and the second dc/dc converter 905 may be configured to operate in the display mode.

Meanwhile, in the first standby mode, the first converter 910 does not operate, but only the second converter 925 may be configured to operate.

That is, in the first standby mode, the voltage step-down device 177 may step down the second DC voltage from the third input terminal TEc and output the stepped-down DC voltage to the first micom 173 and the IR receiver 413. Accordingly, power consumption can be reduced in the first standby mode Meanwhile, the first standby mode may be referred to as a zero watt standby mode.

Meanwhile, in the second standby mode, the first converter 910 does not operate, but only the second converter 925 may be configured to operate, as opposed in what is shown in FIG. 8C.

Meanwhile, in the second standby mode, the second converter 925 may output a DC voltage Vma of a first level, and, in the first standby mode, may output a DC voltage Vmb of a second level lower than the first level.

Meanwhile, the first dc/dc converter 907 may be configured to operate in the second standby mode, and output each converted DC voltage to the network interface 135, the external device interface 130, the memory 140, the micom 174 in the signal processing device 170, and the tuner 110. Accordingly, power consumption can be reduced in the second standby mode.

Meanwhile, in the display mode, the first dc/dc converter 907 may output a DC voltage to the micom 174 in the signal processing device 170.

Meanwhile, the second dc/dc converter 905 may be configured to operate in the display mode, and output each converted DC voltage to the network interface 135, the external device interface 130, the memory 140, the micom 174 in the signal processing device 170, the tuner 110, and the audio output device 185. Accordingly, power consumption can be reduced in the display mode.

Figure 10A:
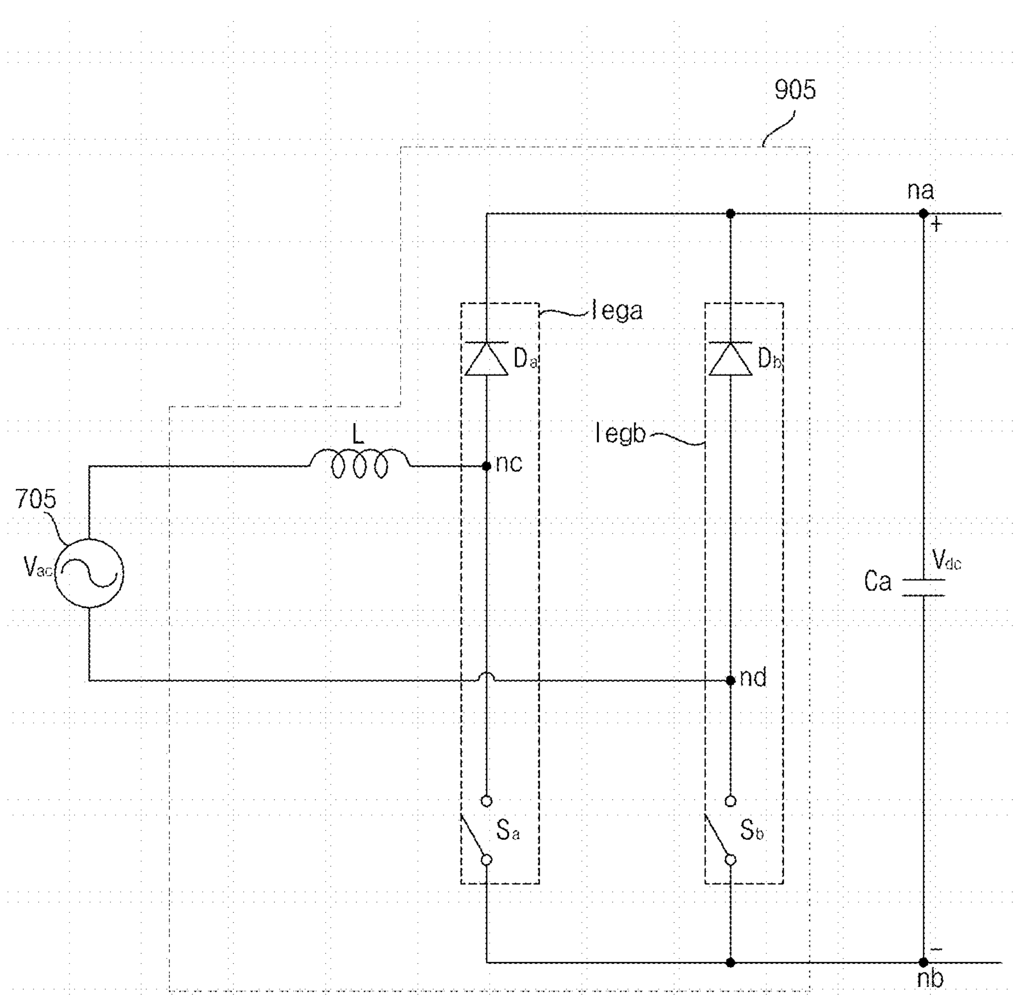
FIG. 10A is an exemplary circuit diagram of an ac/dc converter at the input terminal of the first converter in FIG. 9.

FIG. 10A is an exemplary circuit diagram of an ac/dc converter at the input terminal of the first converter in FIG. 9.

Referring to the drawing, an ac/dc converter 905 for converting input AC power into DC power may be disposed at the input terminal of the first converter 910.

The ac/dc converter 905 may include a plurality of switching elements SA and Sb and a plurality of diode elements Da and Db, in order to efficiently supply a large amount of power, and may convert the level of an input AC voltage Vac and output a DC voltage Vdc, based on a switching operation of the switching elements Sa and Sb.

Specifically, the ac/dc converter 905 may include a first leg lega having a first diode element Da and a first switching element Sa which are connected in series to each other, and a second leg legb having a second diode element Db and a second switching element Sb which are connected in series to each other.

One end (cathode) of the first diode element Da may be connected to one end (na) of an output terminal (na-nb) of the ac/dc converter 905, and the other end (anode) of the first diode element Da may be connected to the first node (nc).

One end of the first switching element Sa may be connected to the first node (nc), and the other end of the first switching element (Sa) may be connected to the other end (nb) of the output terminal (na-nb) of the ac/dc converter 905.

One end (cathode) of the second diode element Db may be connected to one end (na) of the output terminal (na-nb) of the ac/dc converter 905, and the other end (anode) of the second diode element Db may be connected to the second node (nd).

One end of the second switching element Sb may be connected to the second node (nd), and the other end of the second switching element Sb may be connected to the other end (nb) of the output terminal (na-nb) of the ac/dc converter 905.

Meanwhile, the ac/dc converter 905 in FIG. 10A may be referred to as a half bridge-type ac/dc converter.

Meanwhile, the ac/dc converter 905 may further include an inductor L which is disposed between an input terminal for receiving the input AC voltage Vac and the first node nc located between the first diode element Da and the first switching element Sa.

Meanwhile, the first converter 910 connected to both ends of the de-stage capacitor Ca may be connected to an output terminal (nc-nd) of the ac/dc converter 905.

Figure 10B:
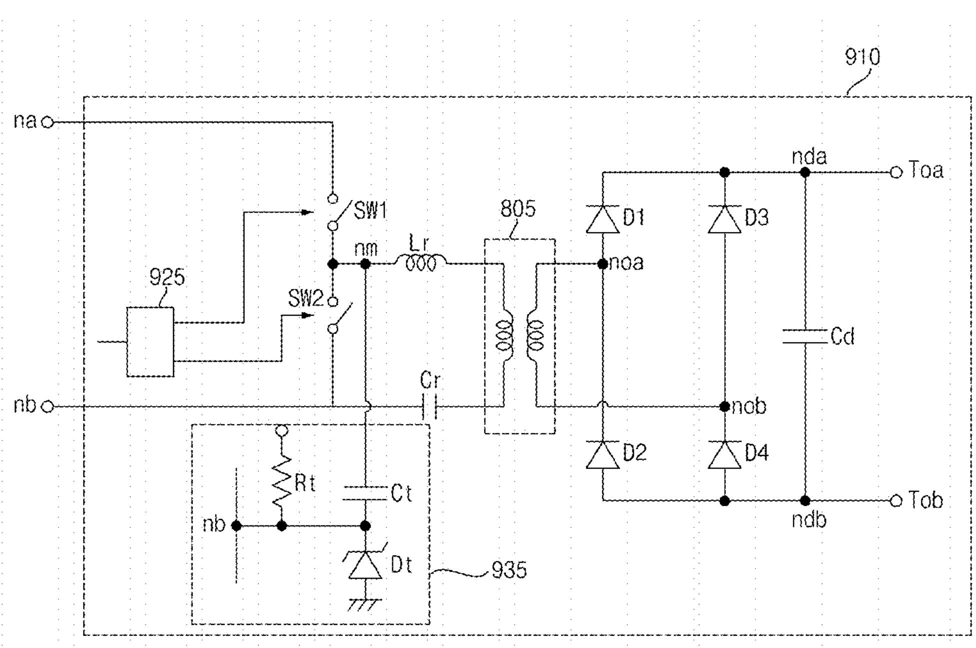
FIG. 10B is an exemplary circuit diagram of the first converter in FIG. 9.

FIG. 10B is an exemplary circuit diagram of the first converter in FIG. 9.

Referring to the drawing, the first converter 910 may be a multi level LLC converter.

The first converter 910 may include a transformer 805, a first switching element SW1 and a second switching element SW2 disposed at an input terminal of the transformer 805 and connected in series to each other, and a resonance capacitor Cr and a resonance inductor Lr each connected between the input terminal of the transformer 905 and the second switching element SW2. Accordingly, a display driving voltage or an operating voltage of the signal processing device 170 can be outputted based on resonance.

Meanwhile, the first converter 910 may further include full bridge diode elements D1 to D4 disposed at an output terminal of the transformer 805 and a capacitor element Cd disposed at both ends (nda-ndb) of an output terminal of the full bridge diode elements D1 to D4. Accordingly, the display driving voltage can be stably outputted based on resonance.

Preferably, no resistor element is disposed at both ends (nda-ndb) of the capacitor element Cd.

Since no resistor element is disposed at both ends (nda-ndb) of the capacitor element Cd, unnecessary power consumption caused by the resistor element can be reduced. Accordingly, the power consumption of the power supply 190 can be reduced.

Meanwhile, the first converter 910 may further include a voltage detection circuit 935 for detecting the voltage at both ends of the second switching element SW2.

Meanwhile, when the voltage at both ends (nm-nb) of the second switching element SW2 detected by the voltage detection circuit 935 is zero, the second switching element SW2 may be turned on. Accordingly, the second switching element SW2 may be zero voltage-switched, thereby reducing noise.

Meanwhile, the voltage detection circuit 935 may include a capacitor Ct connected to a node (nm) between the first switching element SW1 and the second switching element SW2, a Zener diode Dt disposed between the capacitor Ct and a ground terminal, and a resistor element Rt whose one end is connected to a node (nb) between the capacitor Ct and the Zener diode Dt. Accordingly, the voltage at both ends of the second switching element SW2 can be stably detected.

Meanwhile, the first converter 910 may further include a switching controller 925 that controls the first switching element SW1 and the second switching element SW2.

Meanwhile, the switching controller 925 may be configured to control the zero-voltage switching of the second switching element SW2, based on the voltage of the nb node. Accordingly, the second switching element SW2 may be zero voltage-switched, thereby reducing noise.

Figure 10C:
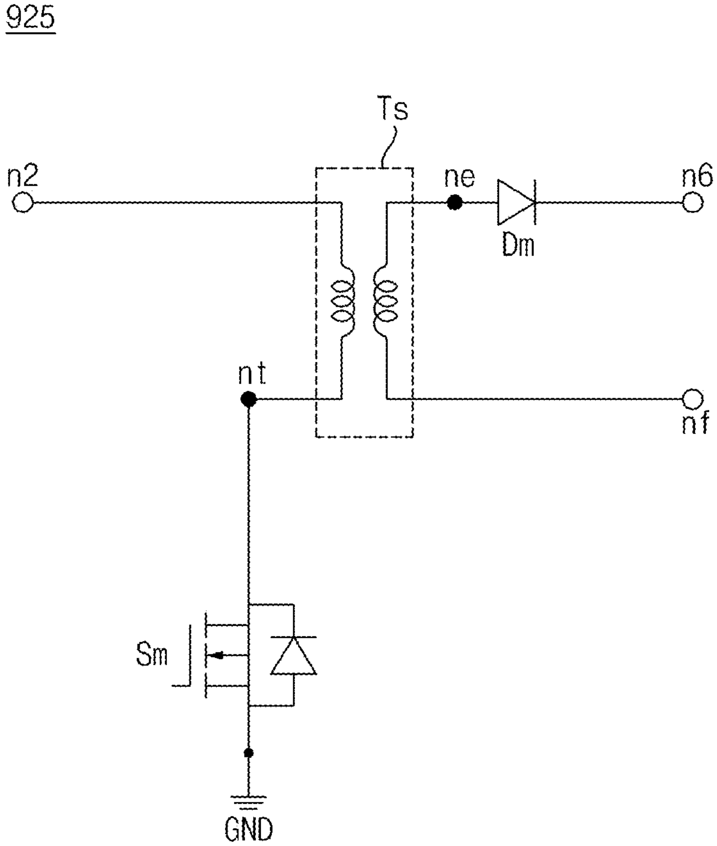
FIG. 10C is an exemplary circuit diagram of the second converter in FIG. 9.

FIG. 10C is an exemplary circuit diagram of the first converter in FIG. 9.

Referring to the drawing, the second converter 925 may include a flyback converter.

That is, the second converter may include a transformer Ts, a switching element sm connected to a node nt at the input of the transformer Ts, and a diode element Dm connected to a node n6 at the output of the transformer Ts.

Accordingly, an input AC voltage Va from the n2 node may be converted into a DC voltage based on switching of the switching element sm and outputted through both ends of an n6-n7 node.

Figure 11:
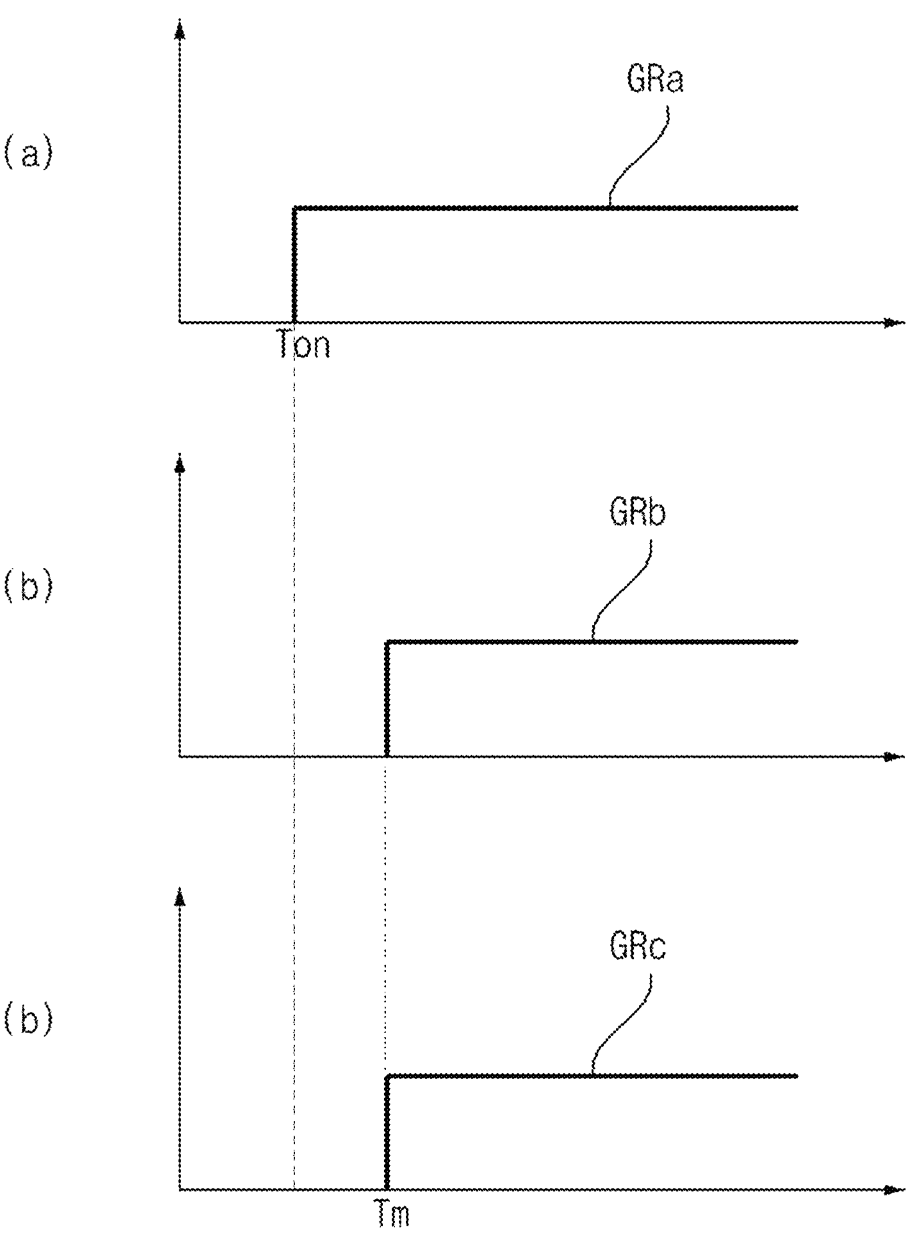
FIG. 11 is a diagram referred to in the description of FIG. 9.

FIG. 11 is a diagram referred to in the description of FIG. 9.

Referring to the drawing, when an input AC voltage Va is inputted into the image display apparatus 100 in FIG. 9 at time Ton, the first converter 910 may be operated, and afterward, the first dc/dc converter 907 and the second dc/dc converter 905 may be operated.

In particular, according to an AC supply mode or an AC on mode, the image display apparatus 100 may supply a DC voltage to the first micom 173, the signal processing device 170, and the second micom 174 in the signal processing device 170 for a predetermined period of time after time Ton.

In the drawing, GRa illustrates that the input AC voltage Va is supplied at time Ton, GRb illustrates that the DC voltage from the first dc/dc converter 907 is supplied at time Tm after time Ton, and GRc illustrates that the DC voltage from the second dc/dc converter 905 is supplied at time Tm after time Ton.

As such, in the AC supply mode or the AC on mode, the timing Tm at which the DC voltage from the second dc/dc converter 905 is supplied to the signal processing device 170 and the timing Tm at which the DC voltage from the first dc/dc converter 907 is supplied to the micom 174 in the signal processing device 170 are the same or approximately the same. Thus, the signal processing device 170 and the micom 174 in the signal processing device 170 can be stably operated.

Figure 12:
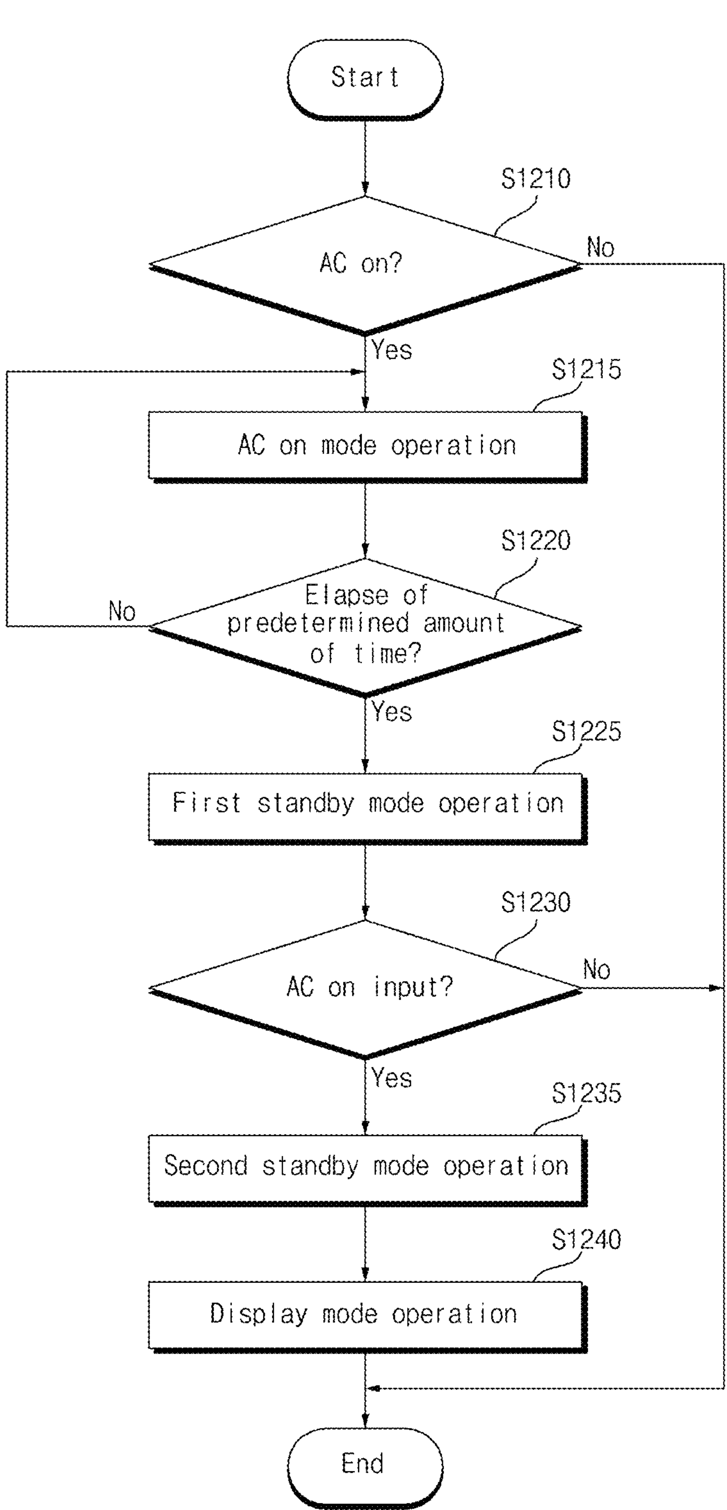
FIG. 12 is an exemplary flowchart showing an operation method of an image display apparatus according to an embodiment of the present disclosure.

FIG. 12 is an exemplary flowchart showing an operation method of an image display apparatus according to an embodiment of the present disclosure. FIGS. 13A to 13D are diagrams referred to in the description of FIG. 12.

Referring to the drawing, when the input AC voltage Va is inputted (S1220) at a first time Ton after a period of time in which the input AC voltage Va is not inputted, the image display apparatus 100 operates in an AC supply mode or an AC on mode (S1215).

Next, the first micom 173 of the image display apparatus 100 determines whether a predetermined amount of time has passed after the first time Ton (S1220), and when so, may end the AC supply mode or the AC on mode and execute a first standby mode (S1225). Accordingly, power consumption can be reduced in the first standby mode.

Meanwhile, in response to a power on input through the IR receiver 413 or the like while executing the first standby mode (S1230), the first micom 173 of the image display apparatus 100 may end the first standby mode and execute the second standby mode (S1235). Accordingly, power consumption can be reduced in the second standby mode.

And, the first micom 173 of the image display apparatus 100 may be configured to execute a display mode immediately after the second standby mode (S1240). Accordingly, the display mode may be execute stably.

On the other hand, after a predetermined amount of time after the first time Ton, the first micom 173 of the image display apparatus 100 may be configured to execute the power mode that was executed when the input AC voltage Va was discontinued, as opposed to what is shown in the drawing.

For example, when the mode that was executed when the input AC voltage Va was discontinued is the second standby mode, the first micom 173 of the image display apparatus 100 may be configured to execute a second standby mode immediately after the AC supply mode or the AC on mode is ended.

For another example, when the mode that was executed when the input AC voltage Va was discontinued is the display mode, the first micom 173 of the image display apparatus 100 may be configured to execute the display mode immediately after the AC supply mode or the AC on mode is ended.

FIGS. 13A to 13D are diagrams referred to in the description of FIG. 12.

Figure 13A:
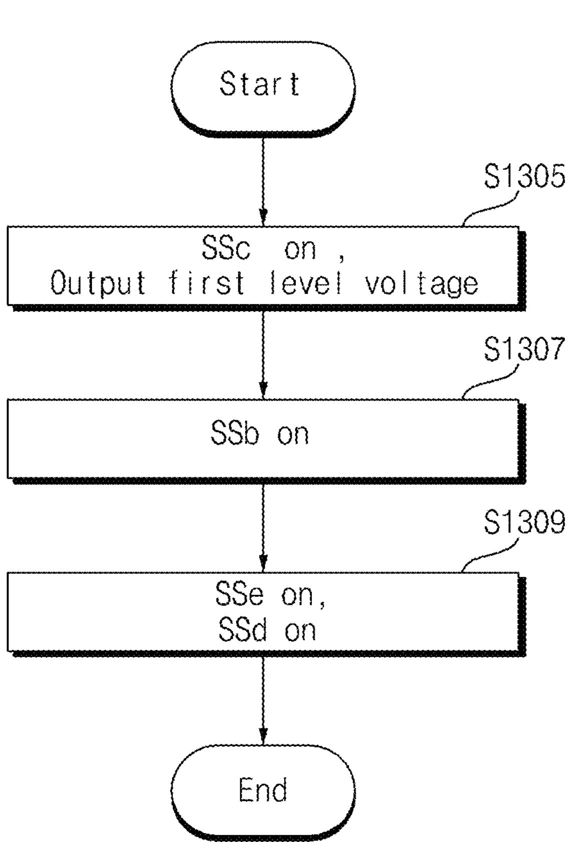
FIGS. 13A to 13D are diagrams referred to in the description of FIG. 12.

First, FIG. 13A is a diagram illustrating an operation in an AC supply mode or an AC on mode.

Referring to the drawing, according to the AC supply mode or the AC on mode, when the input AC voltage Va is inputted at a first time Ton after a period of time in which the input AC voltage Va is not inputted, the first micom 173 may be configured to turn on the first switch 912 and the second switch 914 together at time Tm, as shown in FIG. 11, after the first converter 910 is operated.

In particular, according to the AC supply mode or the AC on mode, when the input AC voltage Va is inputted at the first time Ton after a period of time in which the input AC voltage Va is not inputted, the first micom 173 may output a control signal SSc to the second converter 925 to operate the second converter 925 (S1305).

On the other hand, according to the AC supply mode or the AC on mode, when the input AC voltage Va is inputted at the first time Ton after a period of time in which the input AC voltage Va is not inputted, the first micom 173 may be configured to operate the second converter 925 and, after the second converter 925 is operated, may be configured to control the second converter 925 to output a first level voltage Vma when the first converter 910 is operated.

That is, in the AC supply mode or the AC on mode, the second converter 925 may output the first level voltage Vma.

Next, after the second converter 925 is operated, the first micom 173 may output a control signal Ssb to the first converter 910 to operate the first converter 910 (S1307).

Next, after the first converter 910 is operated, the first micom 173 may output a control signal SSd to the first switch 912 and a control signal SSe to the second switch 914 for both the first switch 912 and the second switch 914 to be turned on at time Tm, as shown in FIG. 11 (S1309).

Accordingly, it is possible to stably operate the signal processing device 170 and the micom 174 in the signal processing device 170 during supply of the input AC voltage Va.

Meanwhile, when the input AC voltage Va is inputted at the first time Ton after a period of time in which the input AC voltage Va is not inputted, the first micom 173 may be configured to turn on the first switch 912 and the second switch 914 together after the second converter 925 and the first converter 910 are operated, and may be configured to control the first converter 910 and the second converter 925 such that only the first converter 910 is turned off after a predetermined period of time.

That is, the first micom 173 may be configured to turn on the first switch 912 and the second switch 914 together after the second converter 925 and the first converter 910 are operated, and may be configured to execute the first standby mode after a predetermined amount of time, as shown in FIG. 12.

Accordingly, the first micom 173 may be configured to turn off only the first converter 910 among the first converter 910 and the second converter 925.

Figure 13B:
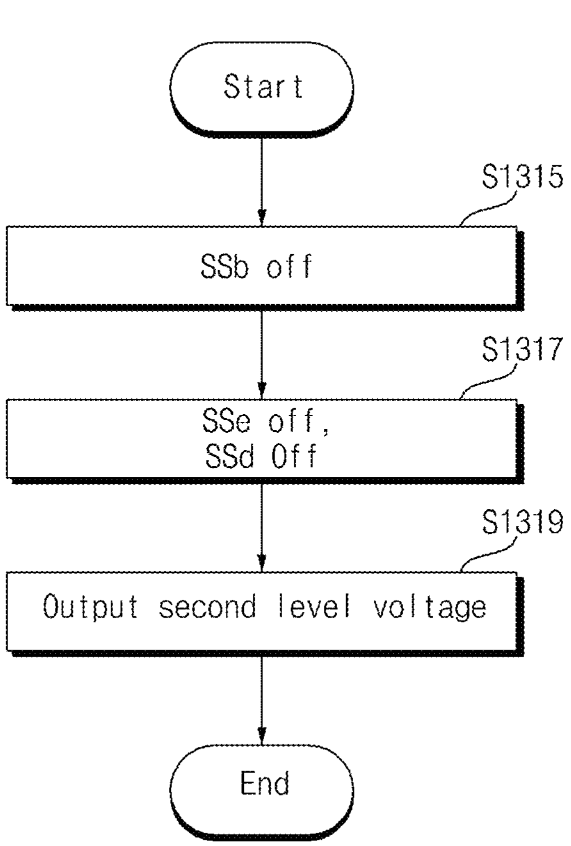

Next, FIG. 13B is a diagram illustrating a first standby mode operation.

Referring to the drawing, based on the first standby mode, the first micom 173 of the image display apparatus 100 may output a control signal SSb to the first converter 910 for the first converter 910 to be turned off (S1315).

Next, after the first converter 910 is turned off, the first micom 173 may output a control signal SSd to the first switch 912 and a control signal SSe to the second switch 914 for both the first switch 912 and the second switch 914 to be turned off (S1317).

Accordingly, in the first standby mode, the first dc/dc converter 907 and the second dc/dc converter 905 do not operate, and as a result, power consumption can be reduced in the first standby mode.

Next, after the first switch 912 and the second switch 914 are turned off, the first micom 173 may be configured to control the second converter 925 to output a second level voltage Vmb lower than the first level (S1319). Accordingly, power consumption can be reduced in the first standby mode.

Figure 13C:
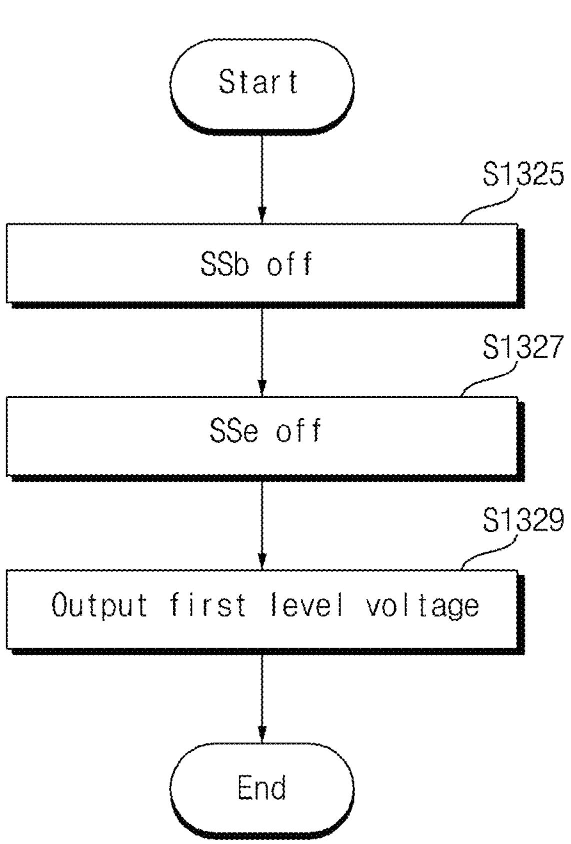

Next, FIG. 13C is a diagram illustrating a second standby mode operation.

Referring to the drawing, according to the second standby mode, the first micom 173 of the image display apparatus 100 may output a control signal SSb to the first converter 910 such that the first converter 910 is turned off (S1325).

Next, after the first converter 910 is turned off, the first micom 173 may output a control signal SSd to the first switch 912 for the first switch 912 to be turned off (S1327).

In this case, after the first converter 910 is turned off, the first micom 173 may output a control signal SSe to the second switch 914 for the second switch 914 to be turned on.

Next, after the first switch 912 is turned off and the second switch 914 is turned on, the first micom 173 may output a control signal SSc to the second converter 925 for the second converter 925 to output a first level voltage Vma (S1329).

As such, the first converter 910 does not operate in the second standby mode as well, which keeps current from flowing through a circuit element or the like after the relay RL, thereby reducing power consumption in the second standby mode.

Meanwhile, in the second standby mode, the second dc/dc converter 905 does not operate, and the first dc/dc converter 907 operates.

Thus, in the second standby mode, the first dc/dc converter 907 may output each converted DC voltage to the network interface 135, the external device interface 130, the memory 140, the micom 174 in the signal processing device 170, and the tuner 110.

Meanwhile, in the second standby mode, the voltage step-down device 177 may be configured to operate, and the voltage step-down device 177 may output each converted DC voltage to the first micom 173, the IR receiver 413, etc.

Figure 13D:
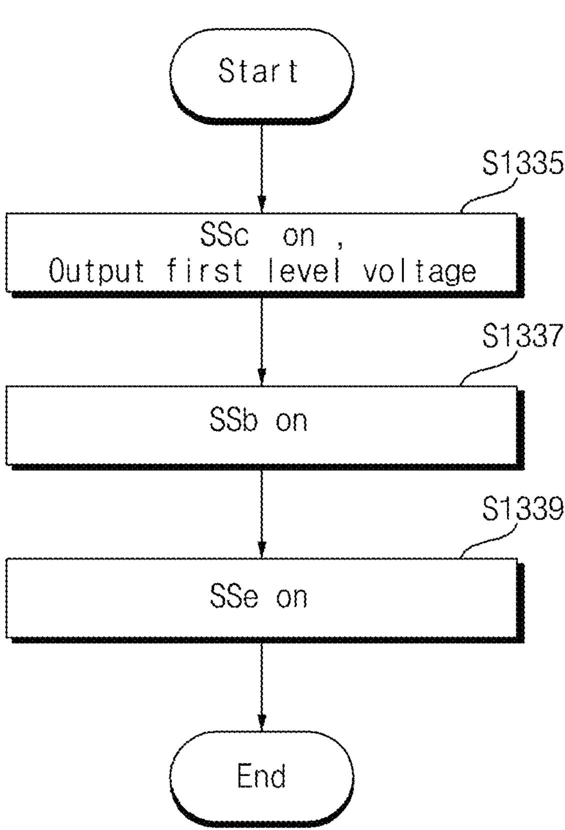

Next, FIG. 13D is a diagram illustrating a display mode operation.

Referring to the drawing, in a display mode, the first micom 173 of the image display apparatus 100 may output a control signal SSc to the second converter 925 to operate the second converter 925, and may be configured to control the second converter 925 to output a first level voltage Vma (S1335).

Next, the first micom 173 may output a control signal SSb to the first converter 910 for the first converter 910 to output a DC voltage (S1337).

Next, the first micom 173 may output a control signal SSe to the second switch 914 for the second switch 914 to be turned on (S1339).

In this case, the first micom 173 may output a control signal SSd to the first switch 912 for the first switch 912 to be turned off. Accordingly, power consumption can be reduced in the display mode.

Consequently, in the display mode, the second dc/dc converter 905 operates, and the first dc/dc converter 907 does not operate.

That is, in the display mode, the second dc/dc converter 905 may output each converted DC voltage to the network interface 135, the external device interface 130, the memory 140, the micom 174 in the signal processing device 170, the tuner 110, and the audio output device 185. Accordingly, the display mode can be execute stably.

FIGS. 14A to 14D are diagrams referred to in the description of FIG. 9 or FIG. 12.

Figure 14A:
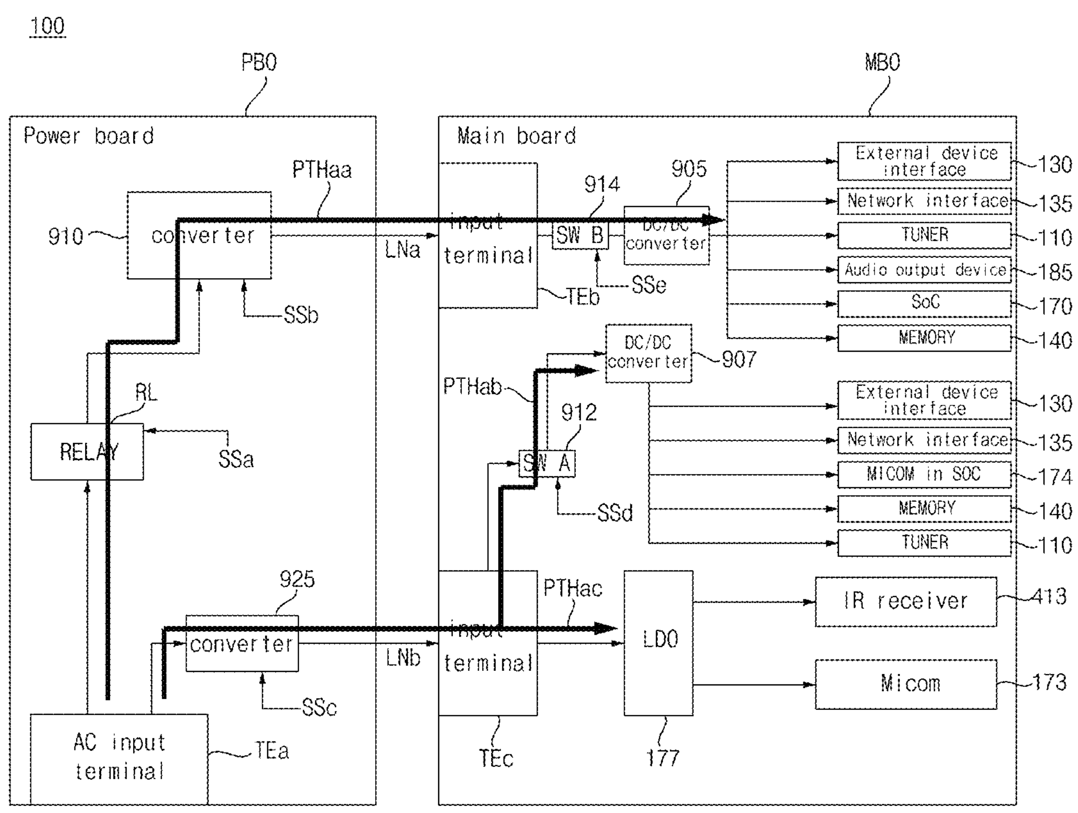
FIGS. 14A to 14D are diagrams referred to in the description of FIG. 9 or FIG. 12.

First, FIG. 14A is a diagram illustrating a current path in the AC supply mode or the AC on mode.

Referring to the drawing, according to the AC supply mode or the AC on mode, the first micom 173 may be configured to turn on the relay RL, the first converter 910, the second switch 914, and the second dc/dc converter 905 for a first current path PTHaa to be formed through the relay RL, the first converter 910, the second switch 914, and the second dc/dc converter 905.

That is, according to the AC supply mode or the AC on mode, the second micom 174, etc. in the signal processing device 170, etc. may be configured to operate based on a DC voltage inputted through the first power line LNa.

Meanwhile, according to the AC supply mode or the AC on mode, the first micom 173 may be configured to turn on the second converter 925, the first switch 912, and the first dc/dc converter 907 for a second current path PTHab to be formed through the second converter 925, the third input terminal TEc, the first switch 912, and the first dc/dc converter 907.

That is, according to the AC supply mode or the AC on mode, the second micom 174, etc. in the signal processing device 170 may be configured to operate based on a DC voltage inputted through the second power line LNb.

Meanwhile, as described above, according to the AC supply mode or the AC on mode, the first micom 173 may be configured to turn on the first switch 912 and the second switch 914 together. Accordingly, it is possible to stably operate the signal processing device 170 and the micom 174 in the signal processing device 170 during supply of the input AC voltage Va.

Meanwhile, according to the AC supply mode or the AC on mode, the first micom 173 may be configured to turn on the second converter 925 and the voltage step-down device 177 for a third current path PTHac to be formed through the second converter 925, the third input terminal TEc, and the voltage step-down device 177.

That is, according to the AC supply mode or the AC on mode, the first micom 173, the IR receiver 413, etc. may be configured to operate based on a DC voltage inputted through the second power line LNb.

Figure 14B:
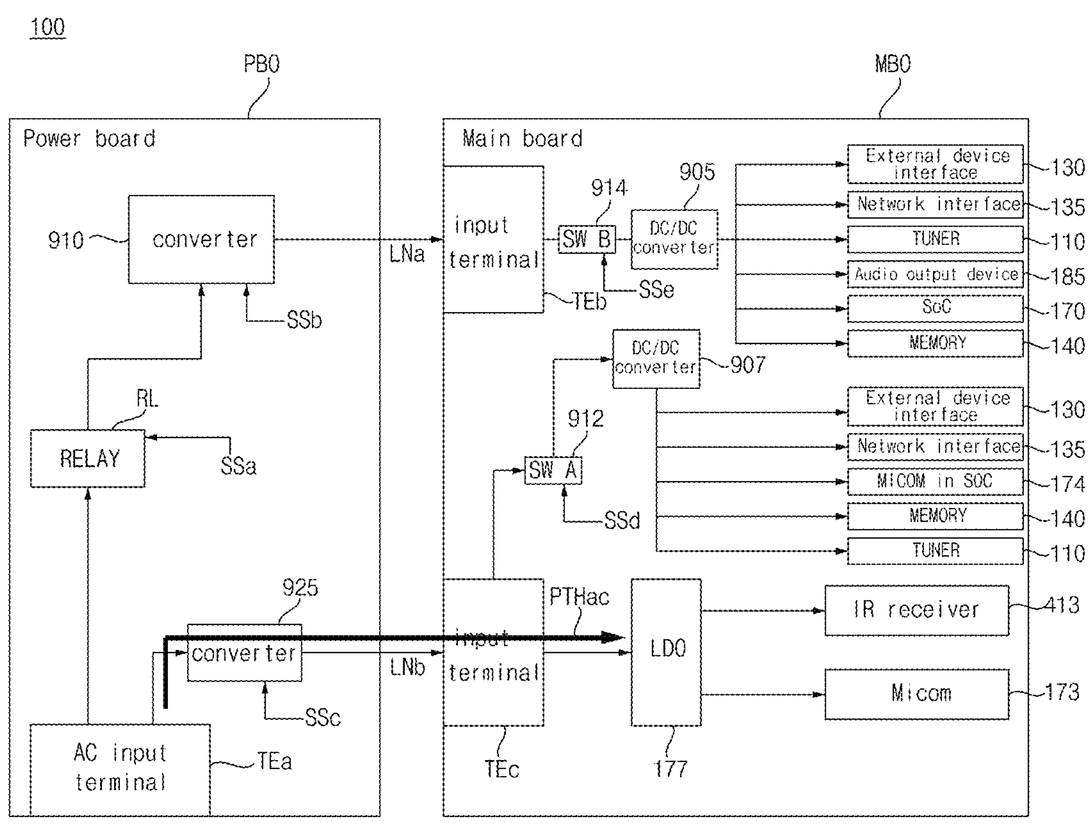

Next, FIG. 14B is a diagram illustrating a current path in the first standby mode.

Referring to the drawing, based on the first standby mode, the first micom 173 may be configured to turn off the relay RL, the first converter 910, the second switch 914, and the second dc/dc converter 905. Accordingly, the first current path PTHaa in FIG. 14A is not formed.

Also, based on the first standby mode, the first micom 173 may be configured to turn off the first switch 912 and the first dc/dc converter 907. Accordingly, the second current path PTHab in FIG. 14A is not formed.

Meanwhile, based on the first standby mode, the first micom 173 may be configured to turn on the second converter 925 and the voltage step-down device 177 for a third current path PTHac to be formed through the second converter 925, the third input terminal TEc, and the voltage step-down device 177.

That is, based on the first standby mode, the first micom 173, the IR receiver 413, etc. may be configured to operate based on a DC voltage inputted through the second power line LNb. Accordingly, power consumption can be reduced in the first standby mode.

Figure 14C:
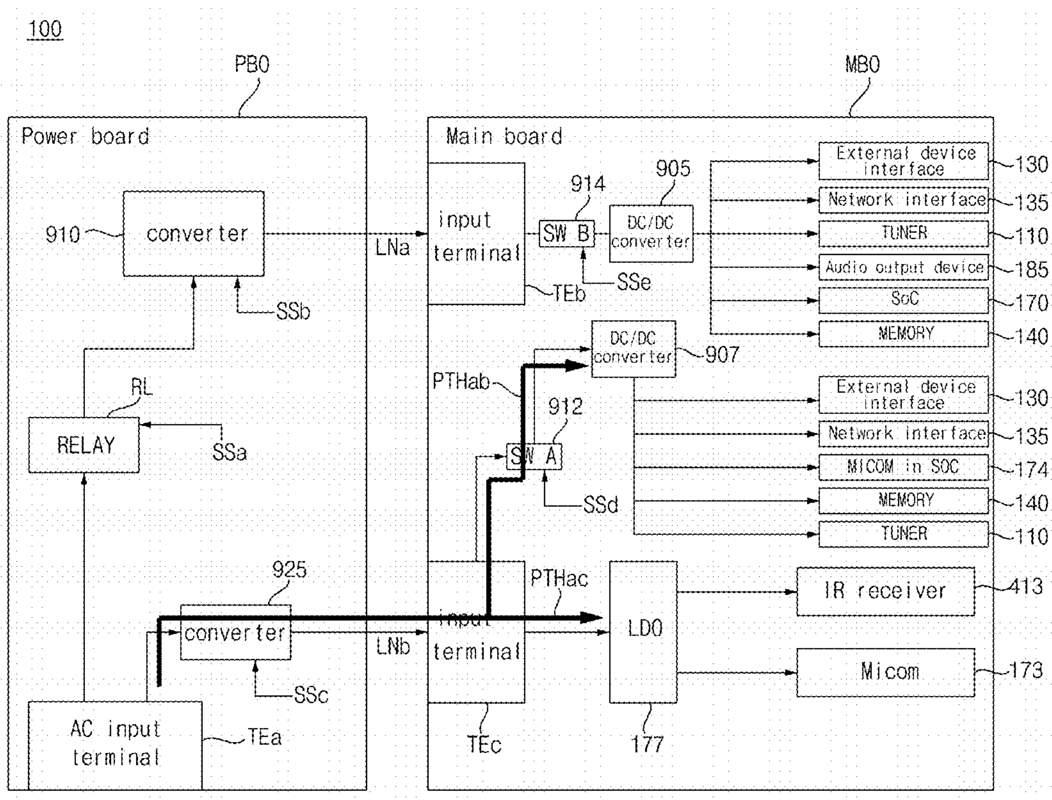

A. Next, FIG. 14C is a diagram illustrating a current path in the second standby mode.

Referring to the drawing, according to the second standby mode, the first micom 173 may be configured to turn off the relay RL, the first converter 910, the second switch 914, and the second dc/dc converter 905. Accordingly, the first current path PTHaa in FIG. 14A is not formed.

Meanwhile, according to the second standby mode, the first micom 173 may be configured to turn on the second converter 925, the first switch 912, and the first dc/dc converter 907 for a second current path PTHab to be formed through the second converter 925, the third input terminal TEc, the first switch 912, and the first dc/dc converter 907.

That is, according to the second standby mode, the second micom 174, etc. in the signal processing device 170 may be configured to operate based on a DC voltage inputted through the second power line LNb.

Meanwhile, according to the second standby mode, the first micom 173 may be configured to turn on the second converter 925 and the voltage step-down device 177 for a third current path PTHac to be formed through the second converter 925, the third input terminal TEc, and the voltage step-down device 177.

That is, according to the second standby mode, the first micom 173, the IR receiver 413, etc. may be configured to operate based on a DC voltage inputted through the second power line LN.

Figure 14D:
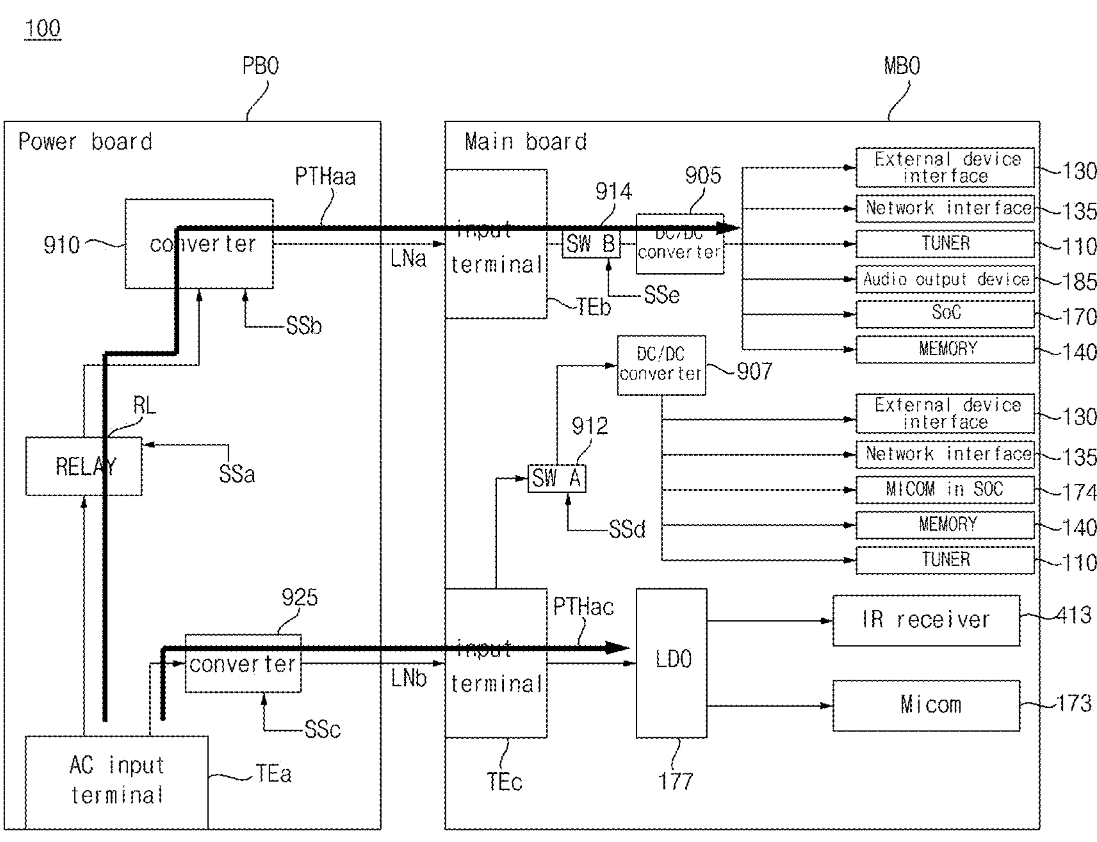

Next, FIG. 14D is a diagram illustrating a current path in the display mode.

Referring to the drawing, according to a display mode, the first micom 173 may be configured to turn on the relay RL, the first converter 910, the second switch 914, and the second dc/dc converter 905 for a first current path PTHaa to be formed through the relay RL, the first converter 910, the second input terminal TEb, the second switch 914, and the second dc/dc converter 905.

That is, based on the display mode, the signal processing device 170, etc. may be configured to operate based on a DC voltage inputted through the first power line LNa.

On the other hand, the first micom 173 may be configured to turn off the first switch 912 and the first dc/dc converter 907 for the second current path PTHab in FIG. 14A to be not formed. Accordingly, power consumption can be reduced in the display mode.

Meanwhile, based on the display mode, the first micom 173 may be configured to turn on the second converter 925 and the voltage step-down device 177 for a third current path PTHac to be formed through the second converter 925, the third input terminal TEc, and the voltage step-down device 177.

That is, based on the display mode, the first micom 173, the IR receiver 413, etc. may be configured to operate based on a DC voltage inputted through the second power line LNb.

Meanwhile, referring to FIGS. 14A to 14D, in the display mode, the signal processing device 170 may be configured to operate based on a DC voltage inputted through the first power line LNa, in the first standby mode, the first micom 173 may be configured to operate based on a DC voltage inputted through the second power line LNb, and in the second standby mode, the second micom 174 in the signal processing device 170 may be configured to operate based on a DC voltage inputted through the second power line LNb.

Accordingly, it is possible to stably operate the signal processing device 170 and the micom 174 in the signal processing device 170 during supply of the input AC voltage Va, and it is possible to reduce power consumption in a standby mode.

As described above, an image display apparatus according to an embodiment of the present disclosure comprises: a display; a relay configured to switch an input AC voltage; a first converter connected to the relay, and configured to convert the input AC voltage into a DC voltage; a second converter spaced apart from the relay, and configured to convert the input AC voltage into a DC voltage; a first micom configured to operate based on the DC voltage from the second converter; a signal processing device including a second micom, and configured to output a video signal to the display; a first switch disposed between the second converter and the second micom; and a second switch disposed between the first converter and the signal processing device. Accordingly, it is possible to stably operate the signal processing device and the micom in the signal processing device during supply of the input AC voltage. Meanwhile, it is possible to reduce power consumption in a standby mode. In particular, it is possible to implement a plurality of standby modes and reduce power consumption in each standby mode.

Meanwhile, when the input AC voltage is inputted at a first time after a period of time in which the input AC voltage is not inputted, the first micom may be configured to turn on the first switch and the second switch together after the first converter is operated. Accordingly, it is possible to stably operate the signal processing device and the micom in the signal processing device during supply of the input AC voltage.

Meanwhile, when the input AC voltage is inputted at the first time after a period of time in which the input AC voltage is not inputted, the first micom may be configured to operate the second converter, operate the first converter after the second converter is operated, and turn on the first switch and the second switch together after the first converter is operated. Accordingly, it is possible to stably operate the signal processing device and the micom in the signal processing device during supply of the input AC voltage.

Meanwhile, when the input AC voltage is inputted at the first time after a period of time in which the input AC voltage is not inputted, the first micom may be configured to operate the second converter, and, after the second converter is operated, control the second converter to output a first level voltage when the first converter is operated. Accordingly, it is possible to stably operate the signal processing device and the micom in the signal processing device during supply of the input AC voltage.

Meanwhile, when the input AC voltage is inputted at the first time after a period of time in which the input AC voltage is not inputted, the first micom may be configured to turn on the first switch and the second switch together after the first converter and the second converter are operated, and turn off only the first converter among the first converter and the second converter after a predetermined period of time. Accordingly, power consumption can be reduced in a standby mode.

Meanwhile, after the first converter is turned off, the first micom may be configured to turn off the first switch and the second switch together. Accordingly, power consumption can be reduced in a standby mode.

Meanwhile, after the first converter is turned off, the first micom may be configured to turn off the first switch and the second switch together, and control the second converter to output a second level voltage lower than the first level. Accordingly, power consumption can be reduced in a standby mode.

Meanwhile, after the first converter is turned off, the first micom may be configured to turn off the first switch and turn on the second switch. Accordingly, power consumption can be reduced in a standby mode.

Meanwhile, after the first converter is turned off, the first micom may be configured to turn off the first switch, turn on the second switch, and the second converter to output the first level voltage. 9

Meanwhile, in a display mode, the first micom may be configured to control the second converter to output the first level voltage and operate the first converter and the first switch. Accordingly, the display mode can be stably execute.

Meanwhile, in the display mode, the first micom may be configured to turn off the second switch. Accordingly, power consumption can be reduced in the display mode.

Meanwhile, when the input AC voltage is inputted at the first time after a period of time in which the input AC voltage is not inputted, the first micom may be configured to turn on the first switch and the second switch together after the second converter and the first converter are operated, execute a first standby mode after a predetermined period of time, and execute a second standby mode in response to a power on input while executing the first standby mode. Accordingly, it is possible to stably operate the signal processing device and the micom in the signal processing device during supply of the input AC voltage. Furthermore, power consumption can be reduced in a standby mode.

Meanwhile, the first micom may be configured to execute a display mode after executing the second standby mode. Accordingly, the display mode can be stably execute.

Meanwhile, based on the first standby mode, the first micom may be configured to turn off the first converter, turn off the first switch and the second switch together after the first converter is turned off, and control the second converter to output a second level voltage lower than the first level. Accordingly, power consumption can be reduced in the first standby mode.

Meanwhile, according to the second standby mode, the first micom may be configured to turn off the first converter, turn off the first switch and turn on the second switch after the first converter is turned off, and control the second converter to output the first level voltage. Accordingly, power consumption can be reduced in the second mode. Meanwhile, based on the display mode, the first micom may be configured to control the second converter to output the first level voltage and operate the first converter and the first switch. Accordingly, the display mode can be stably execute.

Meanwhile, the image display apparatus may further comprise: a first dc/dc converter disposed between the first switch and the second micom; and a second dc/dc converter disposed between the second switch and the signal processing device. Accordingly, various DC voltages can be supplied.

Meanwhile, the image display apparatus may further comprise: a first dc/dc converter disposed between the first switch and the second micom; a second dc/dc converter disposed between the second switch and the signal processing device; and a voltage step-down device disposed between the second converter and the first micom. Accordingly, various DC voltages can be supplied.

According to another embodiment of the present disclosure, an image display apparatus comprises: a display; a first circuit board including a relay configured to switch an input AC voltage, a first converter connected to the relay, and configured to convert the input AC voltage into a DC voltage, and a second converter spaced apart from the relay, and configured to convert the input AC voltage into a DC voltage; and a second circuit board including a first micom configured to operate based on the DC voltage from the second converter, a signal processing device including a second micom, and configured to output a video signal to the display, a first switch disposed between the second converter and the second micom, and a second switch disposed between the first converter and the signal processing device, wherein a first power line is disposed between the first converter and the second switch, and a second power line is disposed between the second converter and the first switch. Accordingly, it is possible to stably operate the signal processing device and the micom in the signal processing device during supply of the input AC voltage. Meanwhile, it is possible to reduce power consumption in a standby mode. In particular, it is possible to implement a plurality of standby modes and reduce power consumption in each standby mode.

Meanwhile, in a display mode, the signal processing device may be configured to operate based on a DC voltage inputted through the first power line, in a first standby mode, the first micom may be configured to operate based on a DC voltage inputted through the second power line, and in a second standby mode, the second micom in the signal processing device may be configured to operate based on a DC voltage inputted through the second power line. Accordingly, it is possible to stably operate the signal processing device and the micom in the signal processing device during supply of the input AC voltage, and power consumption can be reduced in a standby mode.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. An image display apparatus comprising:
a display;
a relay configured to switch an input AC voltage;
a first converter connected to the relay, and configured to convert the input AC voltage into a DC voltage;
a second converter spaced apart from the relay, and configured to convert the input AC voltage into a DC voltage;
a first micom configured to operate based on the DC voltage from the second converter;
a signal processing device including a second micom, and configured to output a video signal to the display;
a first switch disposed between the second converter and the second micom; and
a second switch disposed between the first converter and the signal processing device.

2. The image display apparatus of claim 1, wherein, when the input AC voltage is inputted at a first time after a period of time in which the input AC voltage is not inputted, the first micom is configured to turn on the first switch and the second switch together after the first converter is operated.

3. The image display apparatus of claim 1, wherein, when the input AC voltage is inputted at the first time after a period of time in which the input AC voltage is not inputted, the first micom is configured to operate the second converter, operate the first converter after the second converter is operated, and turn on the first switch and the second switch together after the first converter is operated.

4. The image display apparatus of claim 3, wherein, when the input AC voltage is inputted at the first time after a period of time in which the input AC voltage is not inputted, the first micom is configured to operate the second converter, and, control the second converter to output a first level voltage when the first converter is operated after the second converter is operated.

5. The image display apparatus of claim 1, wherein, when the input AC voltage is inputted at the first time after a period of time in which the input AC voltage is not inputted, the first micom is configured to turn on the first switch and the second switch together after the first converter and the second converter are operated, and turn off only the first converter among the first converter and the second converter after a predetermined period of time.

6. The image display apparatus of claim 5, wherein, after the first converter is turned off, the first micom is configured to turn off the first switch and the second switch together.

7. The image display apparatus of claim 5, wherein, after the first converter is turned off, the first micom is configured to turn off the first switch and the second switch together, and control the second converter to output a second level voltage lower than the first level.

8. The image display apparatus of claim 5, wherein, after the first converter is turned off, the first micom is configured to turn off the first switch and turn on the second switch.

9. The image display apparatus of claim 5, wherein, after the first converter is turned off, the first micom is configured to turn off the first switch, turn on the second switch, and the second converter to output the first level voltage.

10. The image display apparatus of claim 1, wherein, in a display mode, the first micom is configured to control the second converter to output the first level voltage and operate the first converter and the first switch.

11. The image display apparatus of claim 10, wherein, in the display mode, the first micom is configured to turn off the second switch.

12. The image display apparatus of claim 1, wherein, when the input AC voltage is inputted at the first time after a period of time in which the input AC voltage is not inputted, the first micom is configured to turn on the first switch and the second switch together after the second converter and the first converter are operated, execute a first standby mode after a predetermined period of time, and execute a second standby mode in response to a power on input while executing the first standby mode.

13. The image display apparatus of claim 12, wherein the first micom is configured to execute a display mode after executing the second standby mode.

14. The image display apparatus of claim 13, wherein, based on the display mode, the first micom is configured to control the second converter to output the first level voltage and operate the first converter and the first switch.

15. The image display apparatus of claim 12, wherein, based on the first standby mode, the first micom is configured to turn off the first converter, turn off the first switch and the second switch together after the first converter is turned off, and control the second converter to output a second level voltage lower than the first level.

16. The image display apparatus of claim 12, wherein, based on the second standby mode, the first micom is configured to turn off the first converter, turn off the first switch and turn on the second switch after the first converter is turned off, and control the second converter to output the first level voltage.

17. The image display apparatus of claim 1, further comprising:

a first dc/dc converter disposed between the first switch and the second micom; and a second dc/dc converter disposed between the second switch and the signal processing device.

18. The image display apparatus of claim 1, further comprising:

a first dc/dc converter disposed between the first switch and the second micom;

a second dc/dc converter disposed between the second switch and the signal processing device; and a voltage step-down device disposed between the second converter and the first micom.

19. An image display apparatus comprising:

a display;

a first circuit board including a relay configured to switch an input AC voltage, a first converter connected to the relay, and configured to convert the input AC voltage into a DC voltage, and a second converter spaced apart from the relay, and configured to convert the input AC voltage into a DC voltage; and a second circuit board including a first micom configured to operate based on the DC voltage from the second converter, a signal processing device including a second micom, and configured to output a video signal to the display, a first switch disposed between the second converter and the second micom, and a second switch disposed between the first converter and the signal processing device, wherein a first power line is disposed between the first converter and the second switch, and a second power line is disposed between the second converter and the first switch.

20. The image display apparatus of claim 19, wherein, in a display mode, the signal processing device operates based on a DC voltage inputted through the first power line, in a first standby mode, the first micom operates based on a DC voltage inputted through the second power line, and in a second standby mode, the second micom in the signal processing device operates based on a DC voltage inputted through the second power line.

* * * * *